(12) United States Patent
Guo et al.

(10) Patent No.: US 11,496,246 B2
(45) Date of Patent: Nov. 8, 2022

(54) HARQ OPERATION AND POWER CONTROL IN SIDELINK

(71) Applicant: Samsung Electronics Co., Ltd., Suwon-si (KR)

(72) Inventors: Li Guo, Allen, TX (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 16/736,693

(22) Filed: Jan. 7, 2020

(65) Prior Publication Data

US 2020/0228247 A1 Jul. 16, 2020

Related U.S. Application Data

(60) Provisional application No. 62/825,169, filed on Mar. 28, 2019, provisional application No. 62/820,478, filed on Mar. 19, 2019, provisional application No. 62/819,782, filed on Mar. 18, 2019, provisional application No. 62/799,435, filed on Jan. 31, 2019, (Continued)

(51) Int. Cl.
*H04W 4/00* (2018.01)
*H04L 1/18* (2006.01)
*H04L 5/00* (2006.01)
*H04W 72/04* (2009.01)
(Continued)

(52) U.S. Cl.
CPC .......... *H04L 1/1812* (2013.01); *H04L 1/0026* (2013.01); *H04L 1/0073* (2013.01); *H04L 1/1854* (2013.01); *H04L 1/1861* (2013.01); *H04L 5/001* (2013.01); *H04L 5/0048* (2013.01); *H04L 5/0055* (2013.01); *H04W 4/46* (2018.02); *H04W 72/0413* (2013.01)

(58) Field of Classification Search
CPC ... H04L 1/1812; H04L 5/0055; H04L 1/1861; H04L 5/0048; H04L 5/001; H04L 1/0073; H04L 1/0026; H04L 1/1854; H04L 1/0003; H04L 1/0025; H04L 1/1864; H04L 5/0053; H04W 72/0413; H04W 4/46
USPC ........................................................ 370/329
See application file for complete search history.

(56) References Cited

U.S. PATENT DOCUMENTS

2015/0180635 A1* 6/2015 Fujishiro ............... H04L 1/1854
370/329
2019/0052436 A1* 2/2019 Desai .................... H04L 1/1671
(Continued)

FOREIGN PATENT DOCUMENTS

KR 10-2015-0128513 A 11/2015

OTHER PUBLICATIONS

3GPP TR 38.885 V1.0.0, "Study on Vehicle-to-Everything", Release 16, Nov. 2018. (From Applicant's IDS) (Year: 2018).*
(Continued)

*Primary Examiner* — Mang Hang Yeung

(57) ABSTRACT

User equipments (UEs) and methods for hybrid automatic repeat request acknowledgement (HARQ-ACK) operation in a sidelink. A user equipment configured to receive a physical sidelink control channel (PSCCH) that includes a sidelink control information (SCI) format scheduling a reception of a physical sidelink shared channel (PSSCH) that includes a transport block (TB) and to provide HARQ-ACK information for the TB decoding in a physical sidelink feedback channel (PSFCH).

20 Claims, 15 Drawing Sheets

Related U.S. Application Data provisional application No. 62/790,593, filed on Jan. 10, 2019.

(51) Int. Cl.
*H04L 1/00* (2006.01)
*H04W 4/46* (2018.01)

(56) References Cited

U.S. PATENT DOCUMENTS

| | | | | |
|---|---|---|---|---|
| 2020/0100230 | A1* | 3/2020 | Lee | H04L 67/32 |
| 2020/0136760 | A1* | 4/2020 | Hahn | H04L 1/1621 |
| 2020/0205165 | A1* | 6/2020 | Huang | H04L 5/0064 |
| 2021/0250131 | A1* | 8/2021 | Fan | H04L 1/1822 |
| 2021/0320749 | A1* | 10/2021 | Liu | H04L 1/00 |

OTHER PUBLICATIONS

LG, "Feature Lead Summary for Agenda Item 7.2.4.12 Physical Procedures", R1-1813938, Nov. 2018. (From Applicant's IDS) (Year: 2018).*
Oppo, "Physical Layer Procedure for NR-V2X", R1-1812811, Nov. 2018. (From Applicant's IDS) (Year: 2018).*
Nokia, "On Sidelink Unicast, Groupcastand Broadcast", R1-1811426, Oct. 2018. (From Applicant's IDS) (Year: 2018).*
"LTE; Evolved Universal Terrestrial Radio Access (E-UTRA); Physical channels and modulation (3GPP TS 36.211 version 15.4.0 Release 15)", ETSI TS 136 211 V15.4.0, May 2019, 242 pages.
"LTE; Evolved Universal Terrestrial Radio Access (E-UTRA); Multiplexing and channel coding (3GPP TS 36.212 version 15.4.0 Release 15)", ETSI TS 136 212 V15.4.0, Apr. 2019, 249 pages.
"LTE; Evolved Universal Terrestrial Radio Access (E-UTRA); Physical layer procedures (3GPP TS 36.213 version 15.4.0 Release 15)", ETSI TS 136 213 V15.4.0, May 2019, 551 pages.
"LTE; Evolved Universal Terrestrial Radio Access (E-UTRA); Physical layer; Measurements (3GPP TS 36.214 version 15.4 0 Release 15)", ETSI TS 136 214 V15.4.0, Oct. 2019, 28 pages.
"LTE; Evolved Universal Terrestrial Radio Access (E-UTRA); Medium Access Control (MAC) protocol specification (3GPP TS 36.321 version 15.4.0 Release 15)", ETSI TS 136 321 V15.4.0, Apr. 2019, 133 pages.
"LTE; Evolved Universal Terrestrial Radio Access (E-UTRA); Radio Resource Control (RRC); Protocol specification (3GPP TS 36.331 version 15.4.0 Release 15)", ETSI TS 136 331 V15.4 0, Apr. 2019, 929 pages.
International Search Report and Written Opinion of the International Search Authority in connection with International Application No. PCT/KR2020/000393 dated Apr. 28, 2020, 10 pages.
3GPP TR 38.885 V1.0.0 (Nov. 2018), Technical Report, 3rd Generation Partnership Project; Technical Specification Group Radio Access Network; NR; Study on Vehicle-to-Everything (Release 16), Nov. 2018, 23 pages.
LG Electronics, "Feature lead summary for agenda item 7.2.4.1.2 Physical layer procedures," R1-1813938, 3GPP TSG RAN WG1 Meeting #95, Spokane, USA, Nov. 12-16, 2018, 12 pages.
Nokia, et al., "On Sidelink Unicast, Groupcast and Broadcast," R1-1811426, 3GPP TSG RAN WG1 Meeting #94bis, Chengdu, China, Oct. 8-12, 2018, 5 pages.
Oppo, "Physical layer procedure for NR-V2X," R1-1812811, 3GPP TSG RAN WG1 Meeting #95, Spokane, USA, Nov. 12-16, 2018, 5 pages.
Extended European Search Report issued Feb. 3, 2022 regarding Application No. 20738063.5, 6 pages.
LG Electronics, "Updated feature lead summary for agenda item 7.2.4.1.2 Physical layer procedures", 3GPP Tsg Ran NG1 Meeting #95, R1-1814265, Nov. 2018, 12 pages.
Tl, "Discussion on Nr V2X Harq mechanism", 3GPP Tsg Ran WG1 Meeting #95, R1-1813976, Nov. 2018, 4 pages.

* cited by examiner

HARQ OPERATION AND POWER CONTROL IN SIDELINK

CROSS-REFERENCE TO RELATED APPLICATIONS AND CLAIM OF PRIORITY

The present application claims priority to U.S. Provisional Patent Application No. 62/790,593, filed on Jan. 10, 2019; U.S. Provisional Patent Application No. 62/799,435, filed on Jan. 31, 2019; U.S. Provisional Patent Application No. 62/819,782 filed on Mar. 18, 2019; U.S. Provisional Patent Application No. 62/820,478 filed on Mar. 19, 2019; and U.S. Provisional Patent Application No. 62/825,169 filed on Mar. 28, 2019. The content of the above-identified patent document is incorporated herein by reference.

TECHNICAL FIELD

The present application relates generally to wireless communication systems and, more specifically, to HARQ operation and transmission power control in vehicular communications.

BACKGROUND

The present disclosure relates to a pre-5$^{th}$-Generation (5G) or 5G communication system to be provided for supporting higher data rates beyond 4$^{th}$-generation (4G) communication system such as long term evolution (LTE). The present disclosure relates to supporting hybrid automatic repeat request acknowledgement (HARQ-ACK) information reporting in a physical sidelink feedback channel (PSFCH). The present disclosure also relates to enabling or disabling reporting of HARQ-ACK information in response to decoding of a transport block in a physical sidelink control channel (PSCCH) reception. The present disclosure further relates to differentiating reporting of HARQ-ACK information according to a service type. The present disclosure additionally relates to determining a power for a PSFCH transmission. The present disclosure also relates to determining a power for a PSCCH transmission. The present disclosure further relates to determining a power for a PSCCH transmission. Finally, the present disclosure relates to determining a power for a channel state information reference signal (CSI-RS) transmission.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide transmission structures and format in advanced communication systems.

In one embodiment, a method is provided. The method comprises receiving a PSCCH that includes a sidelink control information (SCI) format scheduling a reception of a physical sidelink shared channel (PSSCH), and the PSSCH that includes a transport block (TB). The method further includes decoding the TB and determining whether or not to transmit HARQ-ACK information for the TB decoding in a PSFCH based on a corresponding indication by a binary field in the SCI format. The method further includes transmitting the PSFCH with the HARQ-ACK information based on determining that the binary field indicates reporting of the HARQ-ACK information.

In another embodiment, a UE is provided. The UE includes a receiver configured to receive a PSCCH that includes a SCI format scheduling a reception of a PSSCH, and the PSSCH that includes a TB. The UE also includes a processor operably connected to the receiver. The processor is configured to decode the TB and determine whether or not to transmit hybrid automatic repeat request acknowledgement HARQ-ACK information for the TB decoding in a PSFCH based on a corresponding indication by a binary field in the SCI format. The UE also includes a transmitter operably connected to the processor. The transmitter is configured to transmit the PSFCH with the HARQ-ACK information based on determining that the binary field indicates reporting of the HARQ-ACK information.

In yet another embodiment, another UE is provided. The UE includes a transmitter configured to transmit a PSCCH that includes a SCI format scheduling a reception of a PSSCH, and the PSSCH that includes a TB. The UE also includes a processor operably connected to the transmitter. The processor is configured to determine whether or not to receive HARQ-ACK information for the TB decoding in a PSFCH based on a corresponding indication by a binary field in the SCI format. The UE also includes a receiver operably connected to the processor. The receiver is configured to receive the PSFCH with the HARQ-ACK information based on determining that the binary field indicates reporting of the HARQ-ACK information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v15.4.0, "NR; Physical channels and modulation;" 3GPP TS 36.212 v15.4.0, "NR; Multiplexing and Channel coding;" 3GPP TS 36.213 v15.4.0, "NR; Physical Layer Procedures for Control;" 3GPP TS 36.214 v15.4.0, "NR; Physical Layer Procedures for Data;" 3GPP TS 36.321 v15.4.0, "NR; Medium Access Control (MAC) protocol specification;" and 3GPP TS 36.331 v15.4.0, "NR; Radio Resource Control (RRC) Protocol Specification."

Figure 1:
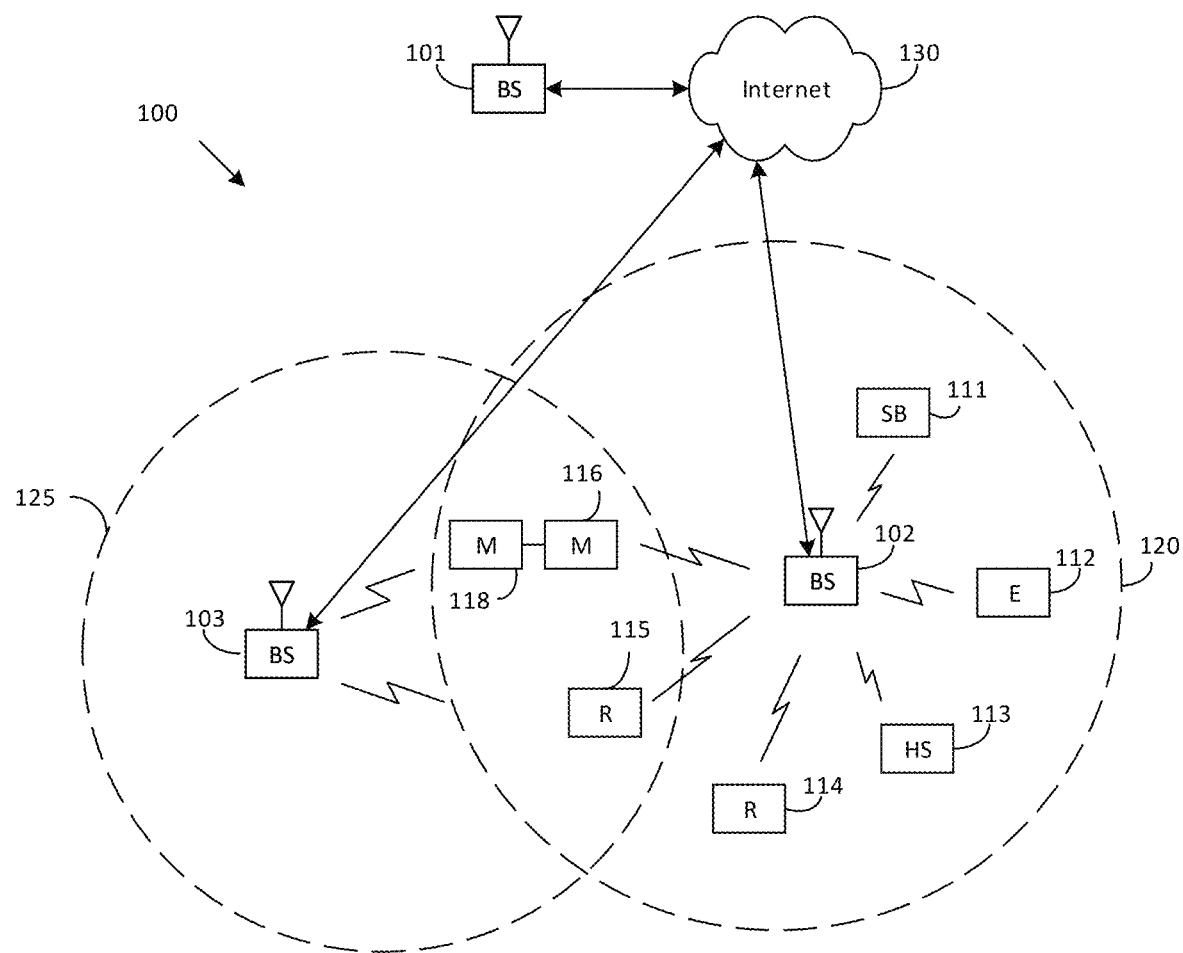
FIG. 1 illustrates an example wireless network according to embodiments of the present disclosure.
Figure 2:
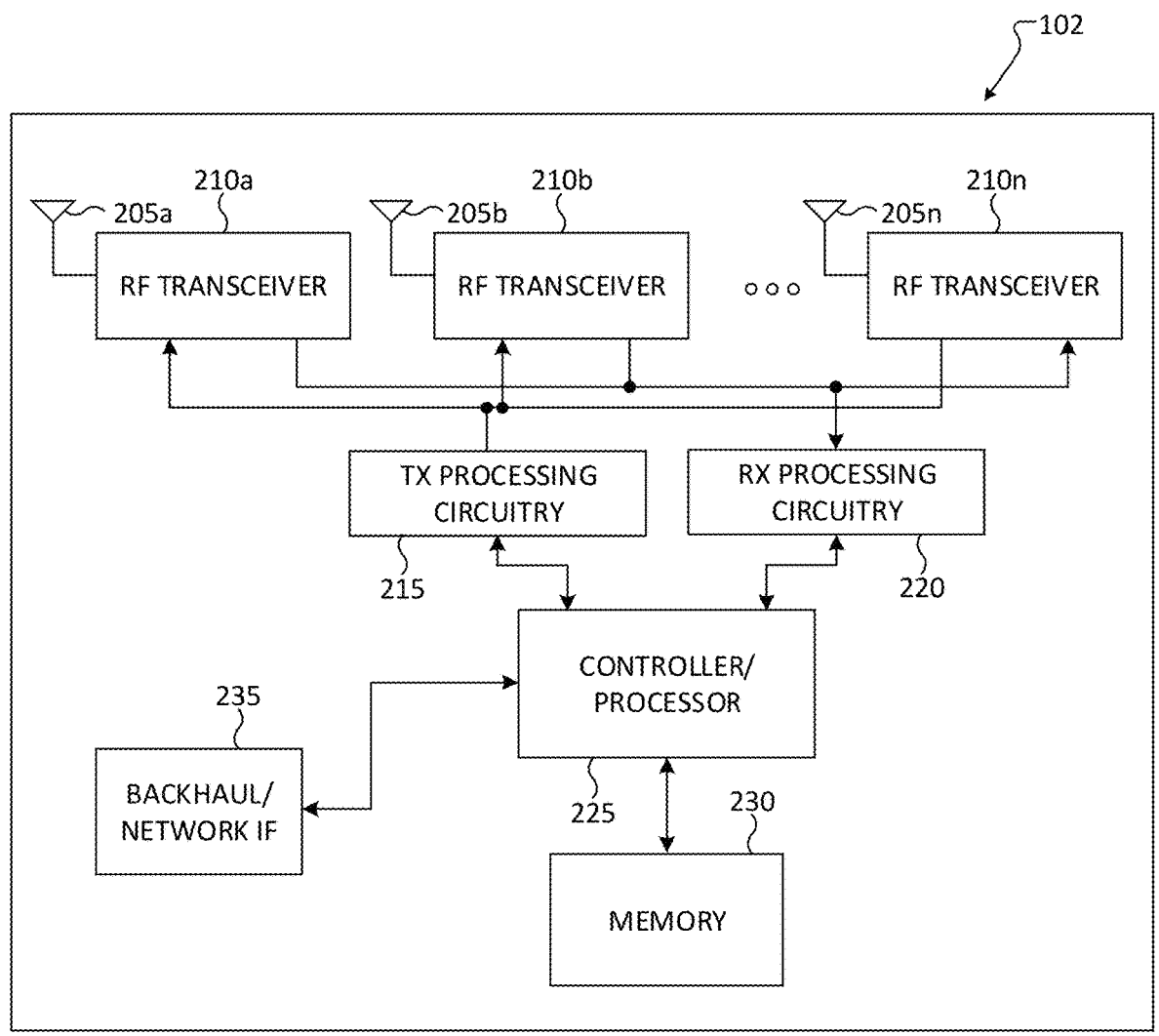
FIG. 2 illustrates an example gNB according to embodiments of the present disclosure.
Figure 3:
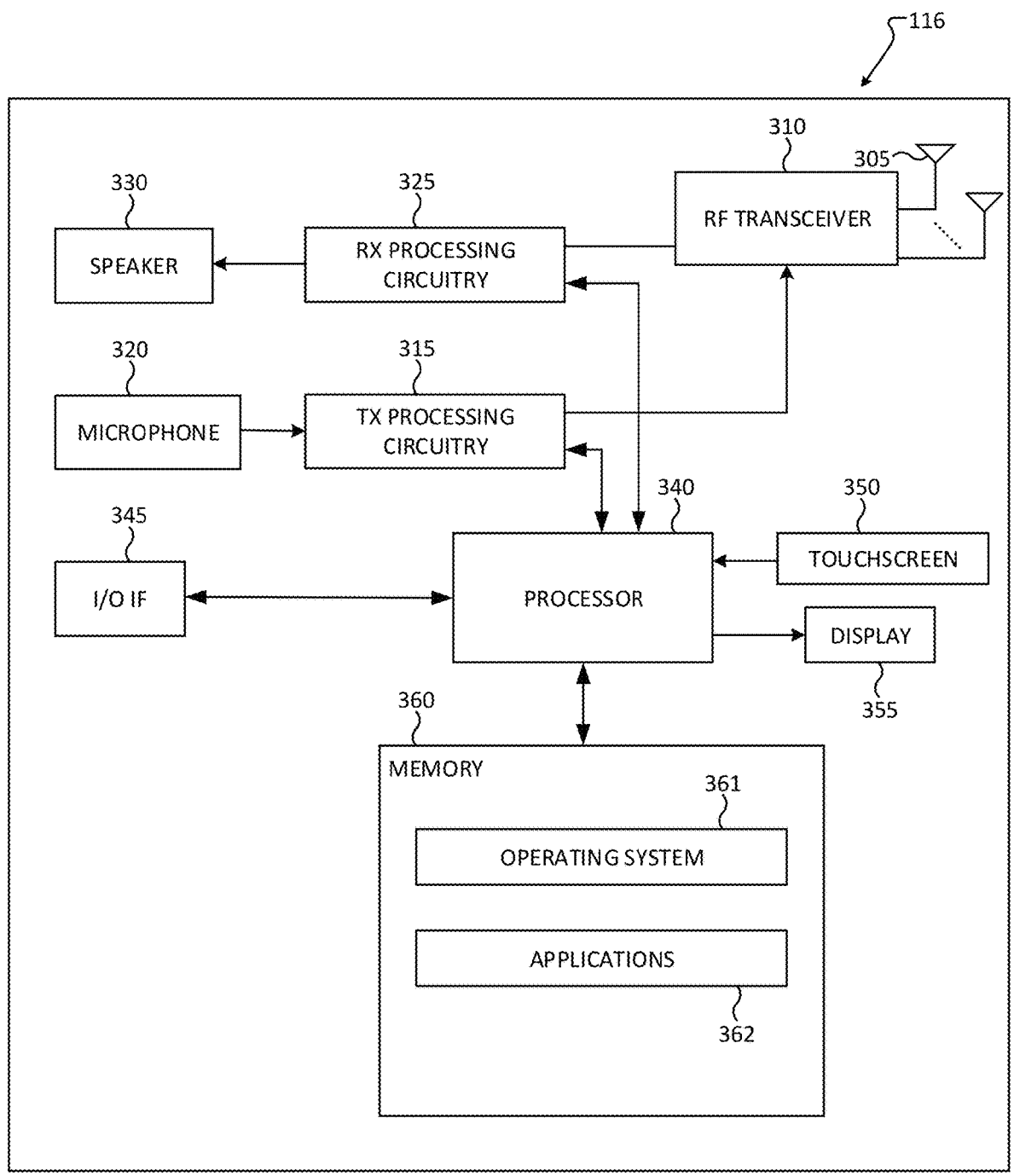
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

In various embodiments, UE 116 can communicate directly with another UE 118 such that UE 116 can act as a gNB for UE 118 as discussed in greater detail below. For example, in some embodiments, the UE 116 and/or UE 118 may be a vehicle and may conduct V2X communications as discussed in greater detail below.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for reception reliability for data and control information in an advanced wireless communication system. In certain embodiments, and one or more of the gNBs 101-103 includes circuitry, programming, or a combination thereof, for efficient reception reliability for data and control information in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure relates generally to wireless communication systems and, more specifically, to vehicular communication network protocols, including vehicle-to-device, vehicle-to-vehicle, and vehicle-to-network communication resource allocation and synchronization methods. A communication system includes a downlink (DL) that conveys signals from transmission points such as base stations (BSs or gNBs) to user equipments (UEs) and an uplink (UL) that conveys signals from UEs to reception points such as gNBs. Additionally, a communication system can include a sidelink (SL) to support transmissions and receptions among UEs or among other non-infrastructure-based nodes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, Hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of subcarriers (SCs). For example, a slot can have duration of 0.5 milliseconds or 1 millisecond and include 14 symbols, and a RB can have a BW of 180 kHz or 360 kHz and include 12 SCs with inter-SC spacing of 15 kHz or 30 kHz.

DL signals include data signals conveying information content, control signals conveying DL control information (DCI), and reference signals (RS) that are also known as pilot signals. A gNB can transmit data information or DCI through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

Figure 4A:
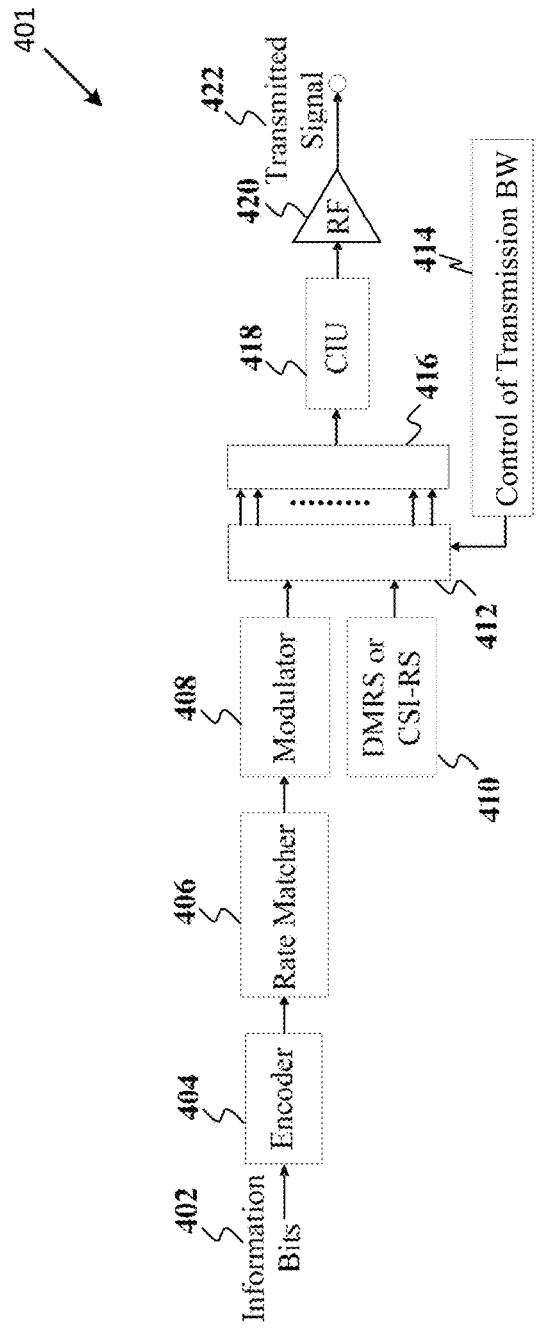
FIG. 4A illustrates an example transmitter structure according to various embodiments of the present disclosure.

FIG. 4A illustrates an example transmitter structure 401 using OFDM according to embodiments of the present disclosure. An embodiment of the transmitter structure 401 shown in FIG. 4A is for illustration only. One or more of the components illustrated in FIG. 4A can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 402, are encoded by encoder 404, rate matched to assigned time/frequency resources by rate matcher 406, and modulated by modulator 408. Subsequently, modulated encoded symbols and DMRS or CSI-RS 410 are mapped to SCs 412 by SC mapping unit 414, an inverse fast Fourier transform (IFFT) is performed by filter 416, a cyclic prefix (CP) is added by a CP insertion unit (CIU) 418, and a resulting signal 422 is filtered by a filter and transmitted by an radio frequency (RF) unit 420.

Figure 4B:
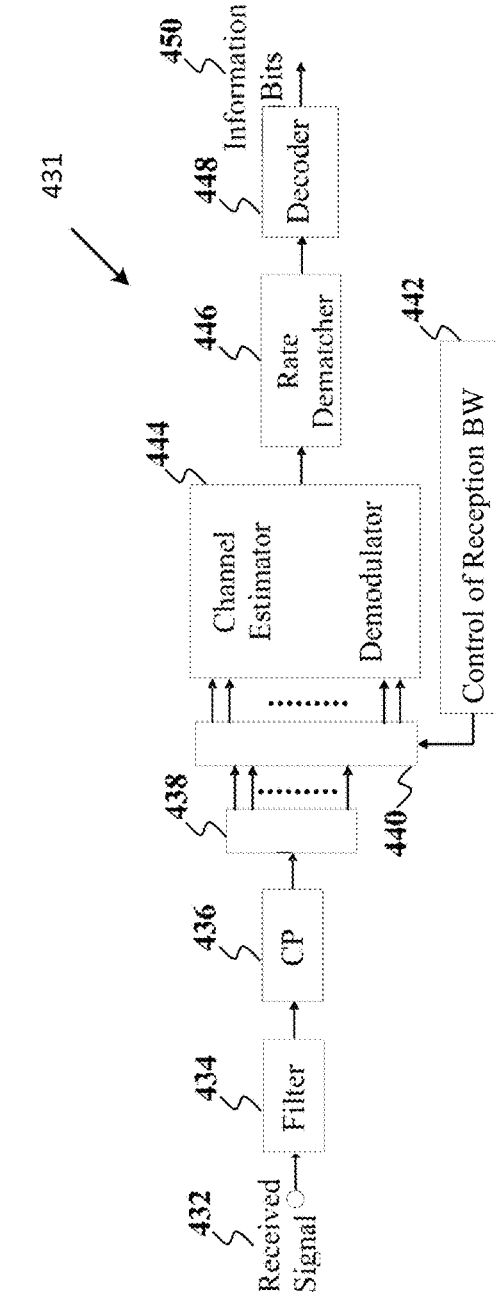
FIG. 4B illustrates an example receiver structure according to various embodiments of the present disclosure.

FIG. 4B illustrates an example receiver structure 431 using OFDM according to embodiments of the present disclosure. An embodiment of the receiver structure 431 shown in FIG. 4B is for illustration only. One or more of the components illustrated in FIG. 4B can be implemented in specialized circuitry configured to perform the noted functions or one or more of the components can be implemented by one or more processors executing instructions to perform the noted functions. Other embodiments are used without departing from the scope of the present disclosure.

A received signal 432 is filtered by filter 434, a CP removal unit 436 removes a CP, a filter 438 applies a fast Fourier transform (FFT), SCs de-mapping unit 440 de-maps SCs selected by BW selector unit 442, received symbols are demodulated by a channel estimator and a demodulator unit 444, a rate de-matcher 446 restores a rate matching, and a decoder 448 decodes the resulting bits to provide information bits 450.

Figure 4C:
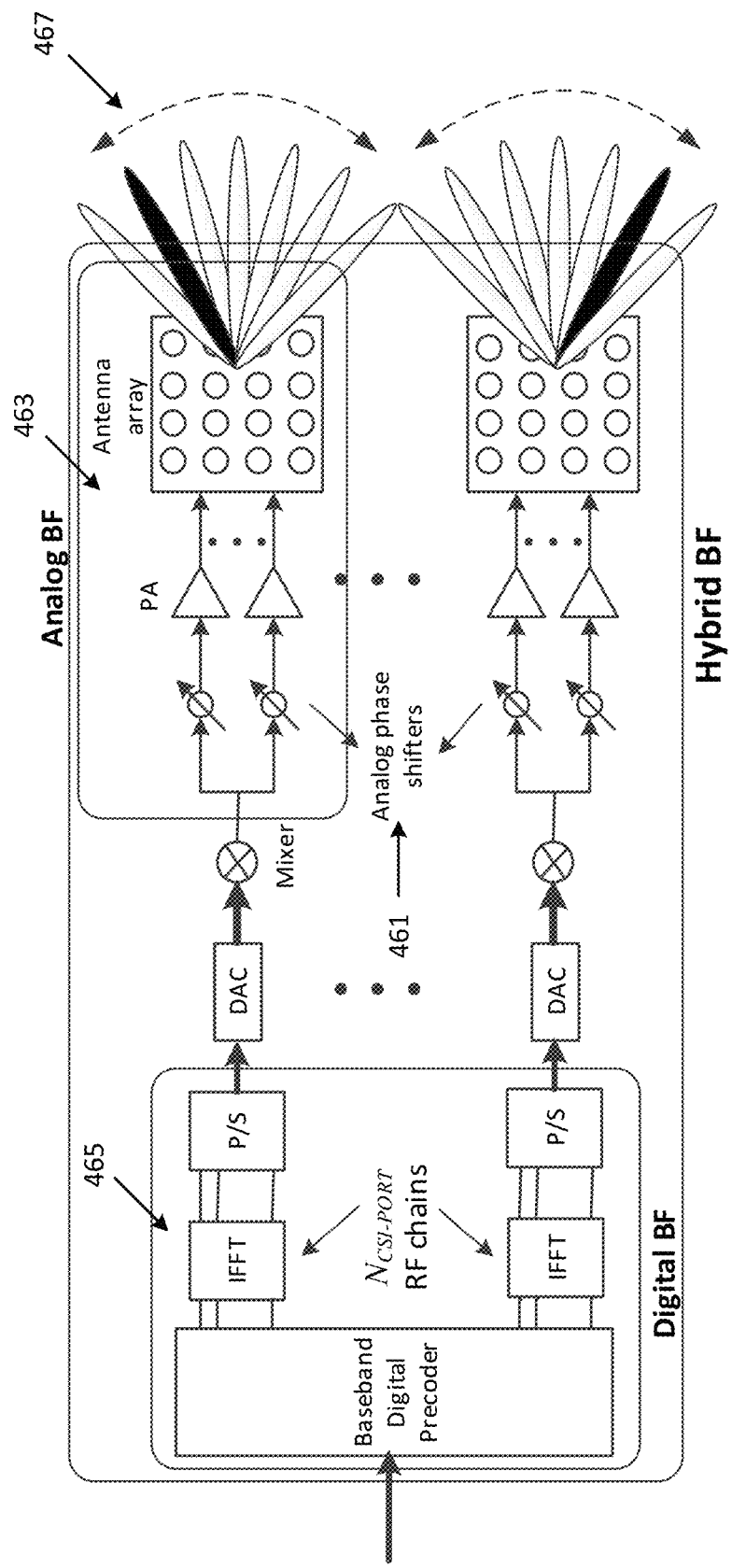
FIG. 4C illustrates an example for a mapping of a CSI-RS port to antenna elements according to various embodiments of the present disclosure.

FIG. 4C illustrates an example for a mapping of a CSI-RS port to antenna elements according to various embodiments of the present disclosure. In various embodiments, the transmitter structure 401 and receiver structure 431 can be implemented as the antenna elements in FIG. 4C. In various embodiments, the transmitter structure 401 and receiver structure 431 can be implemented in FIGS. 2 and 3.

One CSI-RS port is mapped onto a number of antenna elements that can be substantially larger than one and can be controlled by a bank of analog phase shifters 461. One CSI-RS port can then correspond to one sub-array that produces a narrow analog beam through analog beamforming 463. The analog beam can be configured to sweep across a wider range of angles 467 by varying the phase shifter bank across symbols or slots. A number of sub-arrays (equal to the number of RF chains) is same as a number of CSI-RS antenna ports $N_{CSI\text{-}PORT}$. A digital beamforming unit 465 performs a linear combination across $N_{CSI\text{-}PORT}$ analog beams to increase precoding gain. While analog beams are wideband (hence not frequency-selective), digital precoding can be varied across frequency sub-bands or resource blocks. For mmWave bands, although a number of antenna elements can be larger for a given form factor, a number of CSI-RS antenna ports, that can correspond to the number of digitally precoded antenna ports, it typically limited due to hardware constraints, such as a feasibility to install a large number of ADCs/DACs at mmWave frequencies.

Traditionally, cellular communication networks have been designed to establish wireless communication links between UEs and fixed communication infrastructure components, such as gNBs, that serve UEs in a wide or local geographic range. However, a wireless network can also be implemented by utilizing only device-to-device (D2D) communication links without the need for fixed infrastructure components. This type of network is typically referred to as an "ad-hoc" network. A hybrid communication network can support devices that connect both to fixed infrastructure components and to other D2D-enabled devices. While UEs such as smartphones can be envisioned for D2D networks, vehicular communication can also be supported by a communication protocol where vehicles exchange control or data information with other vehicles or with infrastructure or UEs. Such a network is referred to as a V2X network. Multiple types of communication links can be supported by nodes in a V2X network. The communication links can utilize same or different protocols and systems.

Figure 5:
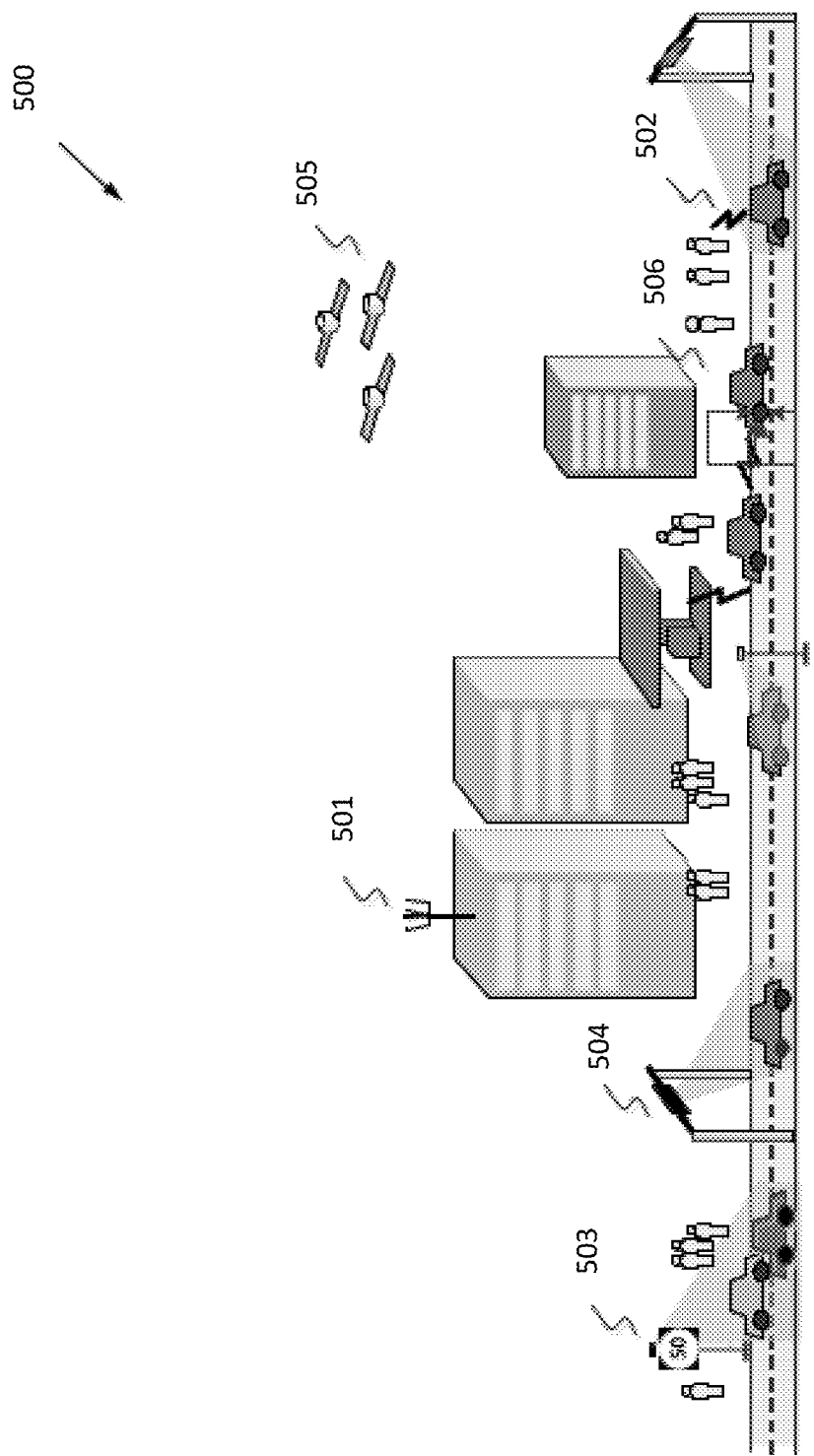
FIG. 5 illustrates an example of a vehicle-centric communication network according to various embodiments of the present disclosure.

FIG. 5 illustrates an example of a vehicle-centric communication network according to various embodiments of the present disclosure.

Vehicular communications can be of different types, jointly referred to as Vehicle-to-Everything (V2X), that include the following three types:

Vehicle-to-Vehicle (V2V) Communications
Vehicle-to-Infrastructure (V2I) Communications
Vehicle-to-Pedestrian (V2P) Communications The above three V2X types can use "co-operative awareness" to provide more intelligent services for end-users. Transport entities, such as vehicles, roadside infrastructure, and pedestrians, can collect knowledge of corresponding local environments, such as information received from other vehicles or sensor equipment in proximity, to process and share in order to provide more intelligent services, such as cooperative collision warning or autonomous driving.

V2X communications can be used to implement several types of services, that are complementary to a primary communication network, or to provide new services based on a flexibility of a network topology. V2X can support unicasting, broadcasting, or group/multicasting as potential means for V2V communication 500 where vehicles can transmit messages to all in-range V2V-enabled devices or to a subset of devices that are members of a particular group. V2X can support V2I communication 501 between one or more vehicles and an infrastructure node to provide cellular connectivity as well as specialized services related to control and safety of vehicular traffic. V2X can also support V2P communication 502, for example to provide safety services for pedestrians or traffic management services. V2X multicast communication 503 can be used to provide safety and control messages to a large number of vehicles in a spectrally efficient manner.

While vehicle devices can support several different communication protocols and include support of mandatory or optional features, since the traffic types, QoS requirements, and deployment topologies are distinct from other types of communications, the hardware/software on a vehicle for supporting V2X can have a reduced or specialized functionality compared to other devices. For example, protocols related to low-complexity, low-data rate, and/or low-latency for machine-type communications 504 can be supported such as, for example, traffic tracking beacons. Satellite-based communication 505 can also be supported for V2X networks for communication or positioning services.

Direct communication between vehicles in V2V is based on a sidelink (SL) interface. Sidelink is the UE to UE interface for SL communication and SL discovery. The SL corresponds to the PC5 interface as defined in REF 6. SL communication is defined as a functionality enabling proximity services (ProSe) Direct Communication 506 as defined in REF 6 between two or more nearby UEs using E-UTRA (N) technology but not traversing any network node.

E-UTRA(N) allows such UEs that are in proximity of each other to exchange V2V-related information using E-UTRA(N) when permission, authorization and proximity criteria are fulfilled. The proximity criteria can be configured by the MNO. However, UEs supporting V2V Service can exchange such information when served by or not served by E-UTRA(N) which supports V2X Service. The UE supporting V2V applications transmits application layer information (e.g. about its location, dynamics, and attributes as part of the V2V Service). The V2V payload can be flexible in order to accommodate different information contents, and the information can be transmitted periodically according to a configuration provided by the MNO. V2V is predominantly broadcast-based; V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

Figure 6:
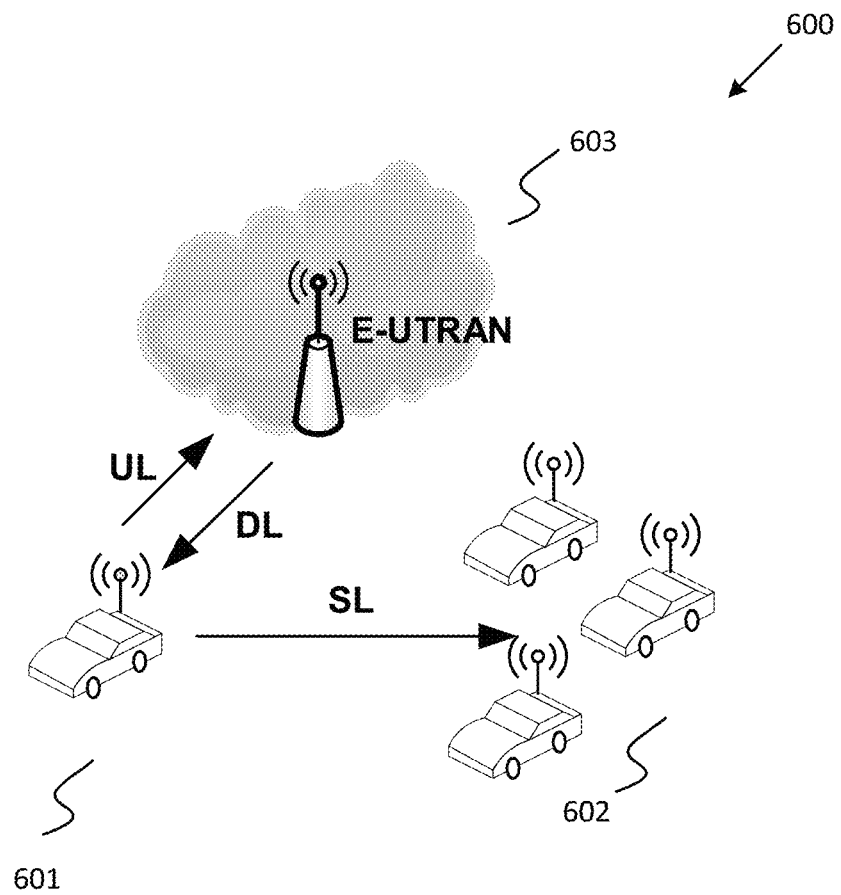
FIG. 6 illustrates an example SL interface according to various embodiments of the present disclosure.

FIG. 6 illustrates an example SL interface 600 according to illustrative embodiments of the present disclosure. UL designates the link from UE 601 to gNB 603, DL designates the link from gNB 603 to UE 601, and SL designates the radio links over the PC5 interfaces between UE 601 and UEs 602. UE 601 transmits a V2V message to one or multiple UEs 602 in the SL. The PC5 interface re-uses existing frequency allocation, regardless of the duplex mode (frequency division duplex (FDD) or time division duplex (TDD). To minimize hardware impact on a UE and especially on the power amplifier of the UE, transmission of V2V links can occur in the UL band in case of FDD. Similar, the PC5 interface can use time resources (symbols of slots) that are reserved for UL transmission in TDD. The signal transmission can based on single carrier frequency division multiple access (SC-FDMA) or on orthogonal frequency division multiple access (OFDMA).

A sidelink can include transmissions of signals and channels as for a downlink or for an uplink. For example, similar to a downlink, a sidelink includes transmission of a physical sidelink control channel (PSCCH) providing a sidelink control information (SCI) format scheduling a reception of a physical sidelink shared channel (PSSCH) providing TB(s) for data information and also includes transmission of corresponding DM-RS or of CSI-RS. For example, similar to uplink, a sidelink includes a physical sidelink feedback channel (PSFCH) providing HARQ-ACK information in response to a decoding outcome of a TB in a PSSCH reception.

For a PSSCH transmission from a first UE to a second UE, the second UE can report in a PSFCH HARQ-ACK information for a decoding outcome of TB provided by the PSSCH reception. The HARQ-ACK information has an ACK value when the second UE correctly decodes the TB and a NACK value when the second UE does not correctly decode the TB. The first UE can report the HARQ-ACK information from the second UE to a serving gNB through the uplink. The second UE can also report the HARQ-ACK information to the serving gNB though the uplink.

In several scenarios, such as for example when a HARQ-ACK reception reliability cannot be ensured or when HARQ-ACK information may not be useful as there may not be retransmissions of a TB, it can be beneficial to dynamically disable reporting of HARQ-ACK information.

Therefore, there is a need to support reporting of HARQ-ACK information in a PSFCH on a sidelink.

There is a need to enable or disable reporting of HARQ-ACK information in response to decoding of a transport block in a PSSCH reception on the sidelink.

There is another need to differentiate reporting of HARQ-ACK information according to a service type.

There is another need for a UE to determine a power for a PSFCH transmission.

There is another need for a UE to determine a power for a PSCCH transmission.

There is another need for a UE to determine a power for a PSSCH transmission.

Finally, there is a need for a UE to determine a power for a CSI-RS transmission.

Reporting of HARQ-ACK information from a UE for a TB decoding in a PSSCH reception on sidelink can be enabled or disabled. When reporting of HARQ-ACK information is enabled, the UE can report HARQ-ACK information to one or both of (a) the UE that transmitted a PSSCH or (b) to a serving gNB. When reporting of HARQ-ACK information is disabled, the UE does not report the HARQ-ACK information to either the UE that transmitted a PSSCH or the serving gNB.

In a first example for enabling or disabling reporting of HARQ-ACK information for a decoding outcome of a TB in a PSSCH reception by a UE, a SL_HARQ_Conf field of 1 bit in a SCI format scheduling the PSSCH reception can indicate whether reporting of HARQ-ACK information in a PSFCH transmission by the UE is enabled of disabled. For example, reporting of HARQ-ACK information is enabled or disabled when a value of the SL-HARQ-Conf field is 1 or 0, respectively.

In a second example, enabling or disabling of HARQ-ACK information reporting for a decoding outcome of a TB in a PSSCH reception can be configured by higher layer signaling.

In a third example, enabling or disabling of HARQ-ACK information reporting for a decoding outcome of a TB in a PSSCH reception can be configured by higher layer signaling and indicated by a SCI format scheduling the PSSCH reception. A UE can be configured with enabling or disabling of HARQ-ACK information reporting for a PSSCH reception by higher layers. For example, the configuration can be as part of a sidelink BWP (bandwidth part) configuration, or as part of a resource pool configuration for resources associated with HARQ-ACK information reporting. If the UE is not configured for HARQ-ACK information reporting for a sidelink BWP or resource pool, the UE does not report HARQ-ACK information for any PSSCH reception in the sidelink BWP or resource pool. Additionally, when HARQ-ACK information reporting for a sidelink BWP or resource pool is enabled by higher layer signaling, a SL_HARQ_Conf field of 1 bit in a SCI format scheduling a PSSCH reception can indicate whether reporting of HARQ-ACK information for the PSSCH reception by the UE is enabled of disabled.

In a fourth example, enabling or disabling of HARQ-ACK information reporting for a decoding outcome of a TB in a PSSCH reception can be implicitly indicated by a configuration of a PSFCH providing HARQ-ACK information. When one or more resources for PSFCH transmission are configured/enabled in a resource pool, a UE can assume that HARQ-ACK information reporting for a PSSCH reception is enabled in the resource pool; otherwise, when no resources for PSFCH transmission are configured/enabled in a resource pool, the UE can assume that HARQ-ACK information reporting is disabled in the resource pool.

A SCI format can include a destination identity (ID) and a reserved value of the destination ID can indicate a broadcast PSSCH transmission. Another value of the destination ID can indicate an ID of a UE receiving a PSSCH that is scheduled by the SCI format. Another value of the destination ID can indicate an ID of one UE group for a groupcast PSCCH transmission. The UE can assume that HARQ-ACK information reporting is disabled when the SCI format indicates a broadcast PSSCH transmission.

Enabling or disabling of HARQ-ACK information reporting for a PSSCH reception can be indicated through a quality of service (QoS) indicator or a priority for a corresponding PSSCH reception. For example, when a QoS or priority indicator for a PSSCH reception by a UE indicates a first value, for example when a TB provided by the PSSCH reception is associated with a low latency service, the UE can assume that reporting of HARQ-ACK information for the PSSCH is disabled while, when the QoS or priority indicator for the PSSCH reception by the UE indicates a second value, a PSFCH transmission with HARQ-ACK information is enabled.

A first UE can transmit a PSSCH providing a TB to a second UE. The TB can include one or more code block groups (CBGs) where each code block (CB) includes a CRC. The second can report whether or not each CBG included in the TB is correctly decoded. A CBG is correctly decoded when all CBs included in the CBG are correctly decoded; otherwise, the CBG is incorrectly decoded. For a retransmission of the TB in a PDSCH, the first UE can include only CBGs with NACK value for corresponding HARQ-ACK information.

Figure 7:
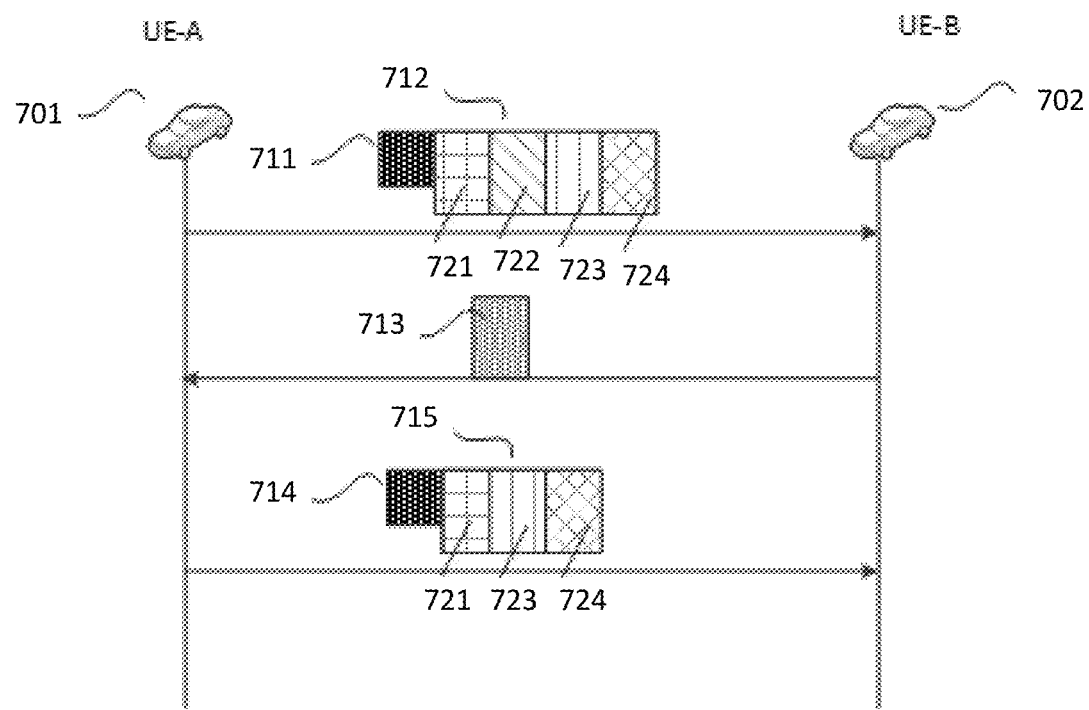
FIG. 7 illustrates a first example of CBG-based HARQ-ACK information reporting on sidelink according to various embodiments of the present disclosure.

FIG. 7 illustrates a first example of CBG-based HARQ-ACK information reporting on sidelink according to various embodiments of the present disclosure.

UE-A transmits PSSCH to UE-B. A PSSCH transmission provides a TB and, with CBG-based HARQ-ACK information reporting from UE-B, PSSCH retransmissions provide CBGs (when some CBGs are indicated by the HARQ-ACK information to have been correctly decoded by UE-B). UE-A 701 can transmit a PSCCH with a SCI format 711 to schedule a PSSCH reception by UE-B 702. A TB in the PSSCH reception 712 includes four CBGs: 721, 722, 723 and 724. After detecting the SCI format 711, UE-B 702 can decode CBs in a corresponding PSSCH reception 712 according to a configuration provided by the SCI format 711. UE-B 702 decodes CBs of each CBG in the TB included in the PSSCH reception 712 and checks a corresponding CBG 721, 722, 723 and 724. UE-B reports HARQ-ACK information of a decoding outcome for each CBG 721, 722, 723 and 724 in a PSFCH 713. In 713, the UE-B can report which ones of CBGs 721, 722, 723 and 724 are decoded correctly. UE-A 701 can re-transmit CBGs that UE-A detects a corresponding HARQ-ACK information to have a NACK value 721, 722, 723 and 724. UE-A can indicate in a SCI format 714 scheduling a retransmission of TB in a PSSCH 715 that three of the four CBGs 721, 723 and 724 are re-transmitted.

SL transmission and reception by a UE occur within resources assigned to one or more UEs in a group of UEs. A resource pool (RP) is a set of resources assigned for sidelink operation. It consists of the slots in the time domain and the resource blocks in the frequency domain.

Figure 8:
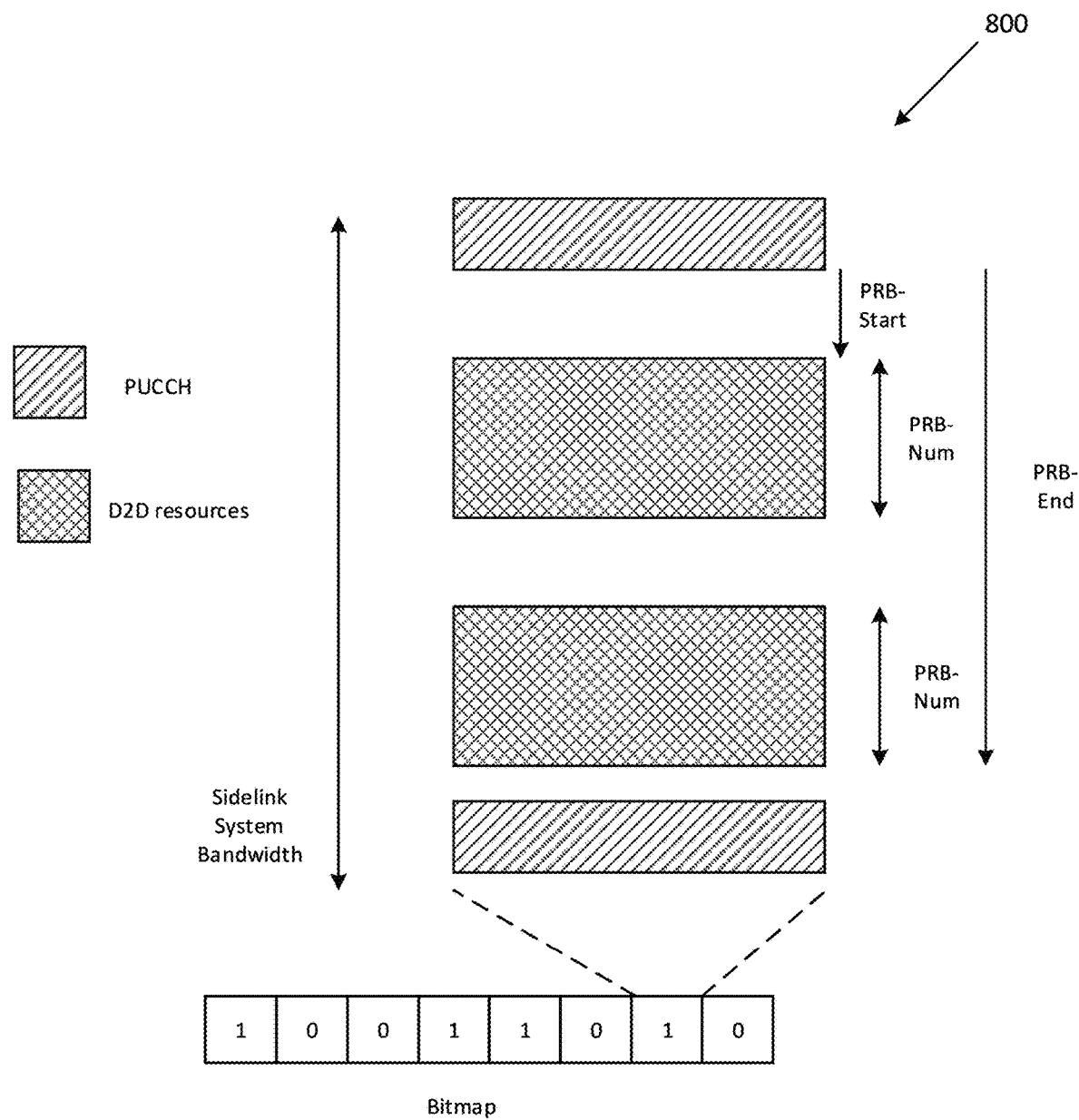
FIG. 8 illustrates an example resource pool for a PSCCH according to various embodiments of the present disclosure.

FIG. 8 illustrates an example resource pool for a PSCCH according to various embodiments of the present disclosure.

A resource pool 800 is defined as follows:
(a) in the frequency domain, by parameters
PRBnum: defining a frequency range/bandwidth in a number of physical RBs (PRB)
PRB start, PRBend: defining a location in frequency for the number of PRBs
(b) in the time domain, by a bitmap that indicates slots available for SL transmissions A pool of time-frequency resources is repeated with a period defined by a parameter SC-Period, for example in a number of slots or in a number of milliseconds with range of possible values between 40 msec and 320 msec where, for example, the smaller values can be used for voice traffic.

Parameters for defining a resource pool can be broadcasted in a System Information Block (SIB) by a gNB. Devices that are not within coverage, and cannot detect the SIB, can use pre-configured values that are internally stored. A UE can transmit a PSCCH to inform UEs of a same group of a next PSSCH transmission with data information. The UE can include an SCI format 1 in a PSCCH with contents as shown in TABLE 1.

TABLE 1

| Parameter | Usage and Notes |
| --- | --- |
| Priority | 3 bits |
| Resource reservation | 4 bits |
| Frequency resource location of initial transmission and retransmission | give the receiving devices information about PSSCH resources in the frequency domain |
| Time gap between initial transmission and retransmission | 4 bits |
| Modulation and coding scheme | 5 bits |
| Retransmission index | 1 bit to indicate first or second transmission |
| Reserved information bits | To make the size of SCI format 1 to be 32 bits |

UEs interested in receiving V2X services can scan a PSCCH pool to detect a SCI format 1 that includes a group identifier for the UEs. A UE transmits a PSCCH with a SCI format 1 within a PSCCH pool of resources.

Resource pools can be of two types: reception resource pools (Rx RPs) and transmission resource pools (Tx RPs). Within a cell, there may be more Rx RPs than Tx RPs to enable reception from adjacent cells or from out-of-coverage UEs.

Two modes of resource allocation exist for V2X communications: Mode 1 that is also referred to as "scheduled resource allocation" and Mode 2 that is also referred as "UE autonomous resource selection". In Mode 1, transmissions on sidelink are scheduled by a gNB. The UE detects a DCI format from the gNB and then transmits a PSCCH with SCI format 1 over resources indicated by the DCI format as summarized in Table 2.

TABLE 2

| Parameter | Usage and Notes |
| --- | --- |
| Carrier indicator | Carrier indicator to support cross carrier scheduling |
| Lowest index of the subchannel allocation to the initial transmission | The resource allocation for PSCCH on V2X sidelink |
| SCI format 1 fields | The resource allocation for PSCCH |
| SL index | 2 bits |
| SL SPS configuration index | 3 bits Configure the SPS transmission on sidelink |
| Activation/release indication | 1 bit to activate or release SPS transmission on sidelink |

Figure 9:
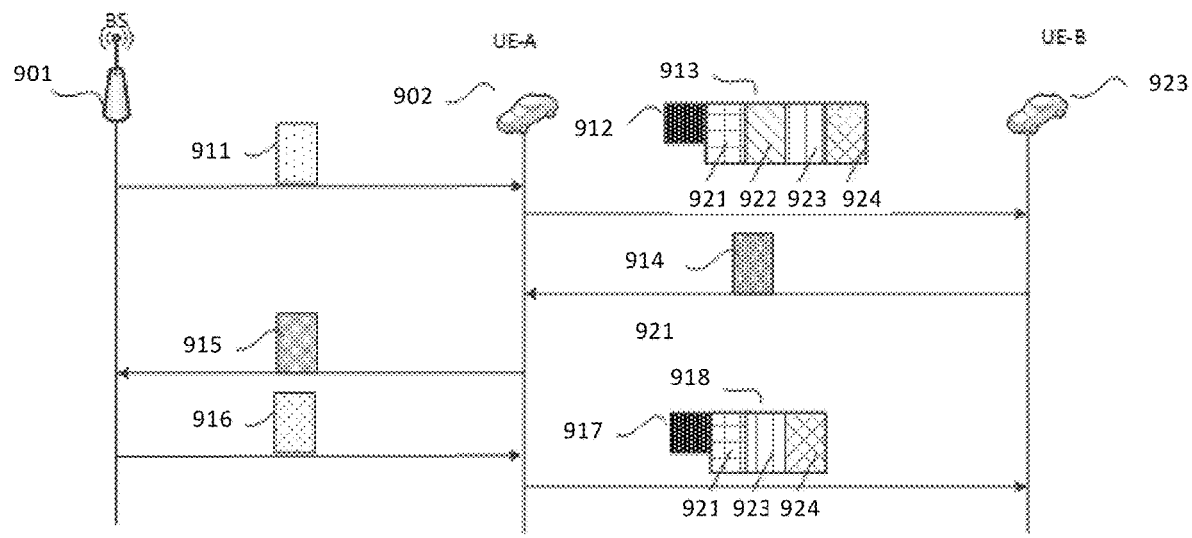
FIG. 9 illustrates a second example of CBG-based HARQ-ACK information reporting on sidelink according to various embodiments of the present disclosure.

FIG. 9 illustrates a second example of CBG-based HARQ-ACK information reporting on sidelink according to various embodiments of the present disclosure.

UE-A 902 transmits a PSSCH to UE-B 903 through sidelink. A sidelink resource used for the PSSCH transmission is allocated to UE-A by a serving gNB, or BS, 901. The BS 901 can transmit a PDCCH to UE-A 911 to allocate, through a corresponding DCI format, to UE-A 902 the sidelink resource for PSCCH and PSSCH transmissions. UE-A transmits a PSCCH and a PSSCH in the allocated sidelink resource. A TB included in a PSSCH reception 913 by UE-B comprises of four CBGs 921, 922, 923 and 924. UE-B 903 detects a SCI format 912 in a PSCCH reception and then decodes the TB in a PSSCH reception 913 according to configuration information provided by the SCI format 912. UE-B decodes each CB for CBGs 921, 922, 923 and 924 and then checks a corresponding CRC. UE-B 903 reports HARQ-ACK information for each of the four CBGs in the PSSCH reception 913 through a PSFCH 914. UE-A can report the detected HARQ-ACK information for the four CBGs 921, 922, 923 and 924 to the serving gNB 901 in a PUCCH or PUSCH transmission 915. The following alternatives can apply for the HARQ-ACK information reports by UE-A in 915:

UE-A can report a number of incorrectly decoded CBGs among the four CBGs 921, 922, 923 and 924.

UE-A can report the incorrectly decoded CBGs among the four CBGs 921, 922, 923 and 924.

UE-A can report the correctly decoded CBGs among the four CBGs 921, 922, 923 and 924.

UE-A can report HARQ-ACK information for each of the four CBGs 921, 922, 923 and 924.

After a reception of a HARQ-ACK information report from UE-A 902, the gNB 901 can transmit a PDCCH to UE-A to allocate, through a DCI format in the PDCCH, a sidelink resource for UE-A 902 to retransmit incorrectly decoded CBGs by UE-B. UE-A 902 can transmit a PSCCH with a SCI format 917 scheduling a PSSCH reception 918 to UE-B that includes the incorrectly decoded CBGs 921, 923 and 924 using the sidelink resource allocated by the gNB 901. In the SCI format 917, UE-A can indicate the CBGs, from the four CBGs 921, 922, 923 and 924, that are included in the PSSCH reception 918.

A UE can transmit a PSCCH providing a SCI format that schedules one or more PSSCH receptions to one or more other UEs. To support CBG-based HARQ retransmissions, the SCI format can include one or more of the following information elements (fields):

A destination ID to identify a UE or a group of UEs for a corresponding PSSCH reception;

A HARQ process number;

A source ID to identify a UE transmitting the PSCCH/PSSCH;

A new data indicator (NDI) to indicate whether the PSSCH includes a first transmission or a retransmission of a TB;

A redundancy version;

CBG transmission indicator to indicate initial transmission or retransmission of a CBG in the PSSCH;

A SL_HARQ_Conf field to indicate whether reporting of HARQ-ACK information for the TB/CBGs of the scheduled PSSCH reception is enabled or disabled;

A resource allocation field for a PSFCH transmission with HARQ-ACK information from a UE receiving the PSSCH.

In one example, each bit of the CBG transmission indicator field can indicate whether or not a CBG of a TB is transmitted in the PSSCH. A size of the CBG transmission indicator field can be configured to a UE by higher layers by configuring a number of CBGs per TB. When the UE is out of coverage of a gNB, the UE can obtain a configuration for a size of the CBG transmission indicator field from a pre-configuration for a sidelink BWP or resource pool.

When the NDI field in a SCI format indicates that a TB in a PSSCH reception is a new TB, the UE can ignore the CBG transmission indicator field in the SCI format and consider that all CBGs in the TB are for an initial transmission. When the NDI field in the SCI format indicates that, for an indicated HARQ process number, a TB in a PSSCH reception is re-transmitted, the UE uses the CBG transmission indicator field to determine CBGs that are retransmitted in the PSSCH.

CBG-based HARQ retransmissions can be enabled or disabled. When disabled, a UE receiving a PSSCH can report HARQ-ACK information for a TB provided by the PSSCH and HARQ retransmissions are TB-based. Different SCI formats can be associated with TB-based HARQ retransmissions and with CBG-based HARQ retransmissions. When CBG-based HARQ retransmission is disabled by higher layers for a sidelink BWP or resource pool, a UE can assume that a SCI format for TB-based HARQ retransmissions is used to schedule PSSCH receptions in the sidelink BWP or resource pool; otherwise, the UE can assume that a SCI format for CBG-based HARQ retransmissions.

A UE can assume TB-based HARQ retransmissions when a PSSCH transmission is groupcast, for example as identified by a field in a SCI format scheduling the PSSCH transmission such as a group ID. For a unicast PSSCH transmission, a UE can determine whether a HARQ retransmission is TB-based or CBG-based according a configuration by higher layers.

For a PSSCH reception by a UE, the UE can report HARQ-ACK information for each CBG included in the PSSCH reception through a PSFCH. The UE can report N1 HARQ-ACK information bits in a PSFCH, or transmit N1 PSFCHs with one HARQ-ACK information bits per PFSCH, for respective N1 CBGs.

A determination of the N1 bits can be according to one of the following

In one example, a value of N1 is provided by higher layers or is preconfigured. For one PSSCH reception, if a number N2 of CBGs is less than N1, the UE can set a first N2 HARQ-ACK information bits according to a decoding outcome for the N2 CBGs and set each of the remaining N1-N2 bits to either zero or one as predetermined in the system operation.

In another example, a value of N1 is equal to a number of CBGs included in the PSSCH reception.

In another example, a value of N1 is equal to a number of CBGs in an initial transmission of a corresponding TB.

A UE can generate HARQ-ACK information bits according to one of the following:

In one example, for a reception of a TB with $N_{CBG}$ CBGs, the UE generates $N_{CBG}$ HARQ-ACK information bits having a one-to-one mapping with the $N_{CBG}$ CBGs in the TB. For a retransmission of the TB, the UE can generate ACK for a HARQ-ACK information bit corresponding to a CBG that the UE correctly decoded in a previous transmission of the TB for a given HARQ process.

In one example, the UE generates HARQ-ACK only for CBGs that are included in the PSSCH reception. The UE generates $N_{HARQ}$ HARQ-ACK information bits having a one-to-one mapping with $N_{HARQ}$ CBGs that are included in the PSSCH reception. A number of HARQ-ACK information bits is then reduced compared to the case that a number of HARQ-ACK information bits is equal to a maximum number of CBGs in a PSCCH reception.

For a groupcast PSSCH reception, an ID of a UE group can be included in a SCI format provided by PSCCH reception. A UE can be configured with $N_{PSFCH}^{max}$ subchannels for PSFCH transmission. Each subchannel can correspond to one time-frequency resource. Each subchannel can also be defined by a combination of one sequence used for PSFCH transmission and one time-frequency resource. For a groupcast PSSCH transmission and CBG-based HARQ retransmissions for a TB having $N_{CBG}$ CBGs, the UE can assume a one-to-one mapping among the $N_{CBG}$ CBGs and the first $N_{CBG}$ subchannels from the $N_{PSFCH}^{max}$ subchannels for PSFCH transmission. In response to a groupcast PSSCH reception by a UE, the UE can generate a HARQ-ACK information bit with NACK value for each CBG that the UE incorrectly decodes and transmit a corresponding PSFCH to indicate the NACK value for the CBG decoding outcome.

In one example, a groupcast PSSCH has a TB with 2 CBGs. A UE receiving the groupcast PSSCH is configured with 4 subchannels for PSFCH transmission. For an initial transmission of a TB, the UE can generate NACK value for each incorrectly decoded CBG and transmit a corresponding PSFCH in the subchannel that corresponds to the CBG, such as a first subchannel for the first CBG (when incorrectly decoded), a second subchannel for the second CBG (when incorrectly decoded), and so on. The UE does not transmit a PSFCH to indicate ACK for a correctly decoded CBG.

A UE can report CBG-based HARQ-ACK information to a serving gNB in order to enable fast reallocation of sidelink resources by the serving gNB for retransmission of a TB by a first UE in a PSSCH. In one example, the first UE can report CBG-based HARQ-ACK information to the serving gNB. In one example, a second UE receiving the PSSCH can report CBG-based HARQ-ACK information to the serving gNB.

In one example, for a PSSCH with $N_{CBG}$ CBGs for one TB, the first UE or the second UE can report HARQ-ACK information for each CBG to the serving gNB. In another example, for a PSSCH with $N_{CBG}$ CBGs for one TB, the first UE or the second UE can report a number of CBGs that are incorrectly decoded.

In one example, a serving gNB allocates resources for PSCCH/PSSCH transmissions from a first UE to a second UE. The second UE can report HARQ-ACK information for a TB or for CBGs in a PSSCH reception to the first UE, and the first UE can report HARQ-ACK information to the serving gNB. For example, for CBG-based HARQ retransmissions and four CBGs for a TB, the first UE can report HARQ-ACK information to a serving gNB as follows:

00 when the HARQ-ACK information from the second UE indicates correct decoding for all CBGs.

01 when the HARQ-ACK information from the second UE indicates incorrect decoding for one CBG.

10 when the HARQ-ACK information from the second UE indicates incorrect decoding for two CBGs.

11 when the HARQ-ACK information from the second UE indicates incorrect decoding for three CBGs.

DTX (no HARQ-ACK reporting) when the HARQ-ACK information from the second UE indicates incorrect decoding for all CBGs or when the first UE does not receive a PSFCH from the second UE.

In one example, the second UE can report HARQ-ACK information for a TB or for CBGs in a PSSCH reception to the serving gNB. For CBG-based HARQ retransmissions and four CBGs for a TB, the second UE can report HARQ-ACK information to a serving gNB as follows:

00 when the second UE correctly decodes all four CBGs 01 when the second UE incorrectly decodes one of the four CBGs 10 when the second UE incorrectly decodes two of the four CBGs 11 when the second UE incorrectly decodes three of the four CBGs The second UE does not report HARQ-ACK information when the second UE incorrectly decodes all CBGs or when does not detect a SCI format scheduling a PSSCH reception.

A UE can report a size of a sidelink resource used for a PSSCH transmission to a serving gNB. The serving gNB can then determine an allocation of a sidelink resource for PSSCH re-transmission.

In one example, the UE can report a size offset, for example using a 2-bit field, relative to a size of sidelink resources the UE allocated for a PSSCH transmission of a TB. A mapping for size offset field values and a sidelink resource size offset can be configured by higher layers. For example, a mapping can be as in Table 3:

TABLE 3

| Size offset field value | Sidelink resource size offset |
|---|---|
| 00 | 0 RBs - same resource size as for previous transmission of the TB |
| 01 | $N_1$ RBs less than resource for previous transmission of the TB |
| 10 | $N_1$ RBs more than resource for previous transmission of the TB |
| 11 | $N_2$ RBs less than resource for previous transmission of the TB |

A first UE can receive a PDCCH and detect a DCI format allocating a sidelink resource for transmission by the first UE of PSCCH/PSSCH. The first UE can indicate a PSFCH configuration in a SCI format scheduling a PSSCH reception by a second UE in order for the second UE to report HARQ-ACK information, for a TB provided by the PSSCH reception, through a PSFCH transmission. The DCI format can also enable or disable a configuration for CBG-based HARQ operation for a TB transmission/retransmission in a PSSCH.

In one example, a serving gNB provides, in a DCI format allocating a sidelink resource for PSCCH/PSSCH transmission by a first UE, a configuration for a PUCCH resource for the first UE to report HARQ-ACK information for a TB decoding in a PSSCH reception by a second UE that is scheduled to the second UE by the first UE.

In order to support a unicast or a groupcast PSSCH reception by a second UE, a SCI format transmitted in a PSCCH by a first UE and scheduling the PSSCH reception by the second UE includes a physical layer destination ID (or Layer 1 destination ID) for the second UE and a physical layer source ID (or Layer1 source ID) for the first UE. The source and destination IDs can be used by the second UE to perform physical layer processing for a PSSCH reception, such as combining of HARQ retransmissions for a TB.

In one example, UE can generate a Layer 1 destination ID based on a Layer 2 (MAC) destination ID. The UE can generate a Layer 1 source ID based on a Layer 2 (MAC) source ID. The Layer 1 destination ID can be the last N1 bits of a Layer 2 destination ID and the Layer 1 source ID can be the last N2 bits of a Layer 2 source ID.

In another example, a first UE transmitting a PSSCH and a second UE receiving the PSSCH can communicate to determine the Layer 1 source and destination IDs for unicast PSSCH transmission/reception. The Layer 1 source and destination IDs can be included in a SCI format scheduling a unicast PSSCH transmission from the first UE and reception by the second UE.

In another example, a first UE transmitting a PSSCH to a second UE can allocate a Layer 1 ID for the second UE that can be used as Layer 1 destination ID in a SCI format scheduling a unicast PSSCH transmission from the first UE to the second UE. Similar, the second UE can allocate a Layer 1 ID to the first UE that can be used as Layer 1 destination ID in a SCI format scheduling a unicast PSSCH transmission from the first UE to the second UE.

In another example, UEs in a group receiving a groupcast PSSCH transmission can be configured with a Layer 1 group ID that is used to identify the group and a Layer 1 UE ID for at least one UE in the group. A UE transmitting a PSSCH to the group can use the Layer1 group ID as a physical destination ID included in a SCI format scheduling the PSSCH reception and can use the UE Layer 1 UE ID as a physical source ID included in the SCI format.

In another example, a UE can be provided a Layer 1 UE ID by a serving gNB. The UE can include the Layer 1 UE ID as a Layer 1 source ID in a SCI format scheduling a PSSCH transmission from the UE or the Layer 1 UE ID can be used as a Layer 1 destination ID in a SCI format scheduling a PSSCH reception by the UE. The Layer 1 UE ID can be referred to as SL-RNTI and can be used to identify the UE in sidelink.

For a groupcast PSSCH transmission, two cases are considered. In a first case, only one UE transmits a PSSCH to a group of UEs. A SCI format scheduling the groupcast PSSCH transmission can include a Layer 1 destination ID to identify the group of UEs receiving the PSSCH. A Layer 1 source ID to identify the UE transmitting the PSSCH may not be included in the SCI format as the PSSCH transmission is from a single UE. In a second case, more than one UEs can transmit a PSSCH to a group of UEs and a Layer 1 source ID can be included in the SCI format scheduling the PSSCH transmission (in addition to a Layer 1 destination ID for the group of UEs).

A UE can inform a groupcast organizer entity (a serving gNB or another UE) to report L1 destination IDs that can be used, or cannot be used, for groupcast PSSCH transmission.

A UE can be provided an association between a minimum communication distance and a sidelink transmission power parameter, such as a maximum transmission power. When the UE transmits a PSCCH/PSSCH, the UE can obtain the minimum communication distance based, for example, on the QoS requirement or priority of a TB in the PSSCH transmission. The UE determines the parameter for the PSCCH/PSSCH transmission power according to an association between the minimum communication distance and the parameter. The UE then calculates the PSCCH/PSSCH transmission according to the sidelink transmission power parameter.

In one example, a UE can be configured a mapping between a minimum communication distance and a sidelink transmission power parameter, for example as in Table 4.

TABLE 4

Association of minimum communication distance and maximum power

| Configuration Index | Minimum communication distance (meters) | Transmission power (dBm) |
|---|---|---|
| 0 | $L_0$ | $P_0$ |
| 1 | $L_1$ | $P_1$ |

TABLE 4-continued

Association of minimum communication distance and maximum power

| Configuration Index | Minimum communication distance (meters) | Transmission power (dBm) |
|---|---|---|
| 2 | $L_2$ | $P_2$ |
| 3 | $L_3$ | $P_3$ |

A UE can obtain the sidelink transmission power parameter for a TB based on a configuration such as in Table 4 and a QoS requirement for the TB.

In one example, the sidelink transmission power parameter can be a maximum power for a PSCCH/PSSCH transmission. For example, when a minimum communication distance for a TB is $L_1$, a UE transmits PSCCH/PSSCH for the TB with a power that is not larger than $P_1$.

In one example, the sidelink transmission power parameter can be a minimum power for a PSCCH/PSSCH transmission. For example, when a minimum communication distance for a TB is $L_1$, a UE transmits PSCCH/PSSCH for the TB with a power that is not smaller than $P_1$.

In one example, the sidelink transmission power parameter can be a maximum EPRE (energy per resource element) for a PSCCH/PSSCH transmission. For example, when a minimum communication distance for a TB is $L_1$, the UE transmits PSCCH/PSSCH for the TB with a power that generates EPRE for the PSCCH/PSSCH transmission that is not larger than $P_1$. A same EPRE applies for the PSCCH transmission and for the PSSCH transmission.

In one example, the sidelink transmission power parameter can be a minimum EPRE for a PSCCH/PSSCH transmission. For example, when a minimum communication distance for a TB is $L_1$, the UE transmits PSCCH/PSSCH for the TB with a power that generates EPRE for the PSCCH/PSSCH transmission that is not smaller than $P_1$. A same EPRE applies for the PSCCH transmission and for the PSSCH transmission.

A resource for a PSFCH transmission by a UE in response to a PSSCH reception by the UE can be indicated in a SCI format scheduling the PSSCH reception. The UE can determine a time resource and a frequency resource for a PSFCH transmission based on the indication by the SCI format and/or based on pre-configuration.

In one example, a SCI format provides:

A PSSCH-to-SL-HARQ_feedback timing indicator field that indicates a slot for a PSFCH transmission with HARQ-ACK information in response to a PSSCH reception scheduled by the SCI format. For example, a value of a PSSCH-to-SL-HARQ_feedback timing indicator indicates a slot offset between a slot of the PSSCH reception and a slot of the PSFCH transmission.

A SL_HARQ_feedback frequency indicator field that indicates a frequency resource for a PSFCH transmission with HARQ-ACK information in response to a PSSCH reception scheduled by the SCI format. For example, a value of SL_HARQ_feedback frequency indicator indicates a frequency domain index of one PSFCH sub-channel or resource.

A DM-RS indicator field that configures a DM-RS in a PSSCH transmission. The DM-RS indicator field can be included in a SCI format scheduling a PSSCH reception to enable flexible DM-RS configuration, including a number of antenna ports that is equal to a number of layers for the PSSCH transmission, a time density, and a frequency density for various sidelink communication scenarios. For example, for unicast PSSCH transmission, a first UE transmitting a PSSCH can adjust a DM-RS density in the PSSCH according to a relative motion between the first UE and a second UE receiving the PSSCH. When a relative speed between the two UEs results to a large Doppler shift, the first UE can choose a larger time-domain DM-RS density. Conversely, when the relative speed results to a low Doppler shift, the first UE can choose a smaller time-domain DM-RS density. An existence of a DM-RS indicator field can be separately configured for a SCI format scheduling unicast PSSCH transmission, a SCI format scheduling groupcast PSSCH transmission, and a SCI format scheduling broadcast PSSCH transmission.

A QoS requirement indicator for a TB can be included in a PSSCH transmission scheduled by the SCI format. The QoS indicator can be used by a UE receiving the PSSCH to determine a QoS requirement for the TB provided by the PSSCH. For example, the UE can derive a minimum communication distance requirement for the TB. The UE can be (pre)-configured a mapping between a code-point of a QoS indicator in the SCI format and a TB QoS requirement. For example, for a QoS indicator field in the SCI format with 4 bits, each of the 16 values/code-points of the QoS indicator field can be mapped to a TB QoS requirement based on a configuration by higher layers or on a pre-configuration.

In one example, a frequency-domain location for a PSFCH resource can be determined based on a frequency domain location of a corresponding PSSCH reception. For example, the frequency-domain starting location of a PSFCH resource can be a function of a frequency-domain starting location of the corresponding PSSCH. For example, a size of available frequency-domain PSFCH resources can depend on a frequency domain size of the corresponding PSSCH. A UE receiving a PSSCH and transmitting a PSFCH with HARQ-ACK information for the PSSCH reception can derive a PSFCH resource as follows:

The UE can derive a time location, such as a slot, for the PSFCH resource based on a value of the PSSCH-to-SL-HARQ_feedback timing indicator field in the SCI format scheduling the PSSCH transmission.

The UE can derive a frequency domain location, such as an RB, for the PSFCH resource based on a location of frequency resources for the PSSCH reception.

A serving gNB can allocate a sidelink resource for a transmission from a first UE to a second UE. The serving gNB can transmit a PDCCH with a DCI format to the first UE to indicate time and frequency resource allocation for:

PSSCH transmission from the first UE
PSCCH transmission from the first UE
PSFCH transmission from the second UE
PUCCH transmission from the first UE for reporting HARQ-ACK information for the PSSCH reception from the second UE.

A SCI format can include a SCI format indicator field for identifying the SCI format. For example, the SCI format indicator field can comprise of 1 bit that indicates whether the SCI format schedules a broadcast PSSCH reception or a unicast/groupcast PSSCH reception. For example, the SCI format indicator field can comprise of 2 bits that indicate a broadcast PSSCH transmission, such as with a value '00', or a groupcast PSSCH transmission, such as with value '01', or a unicast PSSCH transmission, such as with a value '10'. The second UE can interpret the contents of the SCI format according to a value of the SCI format indicator field and the SCI format fields can have different interpretation for different values of the SCI format indicator.

A SCI format scheduling a PSSCH transmission for sidelink broadcast can include one or more of the following parameters:

Layer 1 source ID to identify a UE that transmits a PSCCH/PSSCH

HARQ process number, NDI, and RV in order to support HARQ retransmissions of a TB For a sidelink broadcast PSSCH transmission, reporting of HARQ-ACK information can be disabled. A UE receiving a broadcast PSSCH can use a Layer 1 source ID, a HARQ process number, a NDI, and an RV to identify an initial transmission and a re-transmission of a TB. A SCI format scheduling a broadcast PSSCH transmission may also not include some or all of the fields for a HARQ process number, a NDI, a RV, a Layer 1 source ID, and a Layer 1 destination ID. A re-transmission of a TB provided by a broadcast PSCCH can be based on a non-adaptive HARQ transmission using a pre-defined time-domain and frequency-domain resource determination between a PSSCH with the initial transmission and a PSSCH with a re-transmission of a same TB.

For a first Layer 1 destination ID that is used for unicast PSSCH transmission, a UE can be configured to report HARQ-ACK information. The UE can be configured to report ACK or NACK in a PSFCH transmission when the UE correctly or incorrectly, respectively, decodes a TB in the PSSCH reception. The PSFCH transmission can be through a transmission of a sequence where different cyclic shift values are used to indicate ACK or NACK.

For a second Layer 1 destination ID that is used for a groupcast PSSCH transmission, a UE can be configured, or indicated by a field in the SCI format, to report NACK in a PSFCH transmission when the UE detects the SCI format and incorrectly decodes a TB in a PSSCH reception scheduled by the SCI format. The PSFCH transmission can be through a sequence using a corresponding sequence cyclic shift value. The UE does not transmit a PSFCH to report ACK when the UE correctly decodes the TB in the PSSCH reception.

For a third Layer 1 destination ID that is used for groupcast PSSCH transmission, a UE can be configured, or indicated by a field in the SCI format, to report either ACK or NACK when the UE correctly or incorrectly, respectively, decodes a TB in a PSSCH reception. The UE can be configured a sequence to use for the PSFCH transmission and sequence cyclic shift values for respectively mapping an ACK and a NACK. The procedure for a UE to receive a TB and report a corresponding HARQ-ACK information in a PSFCH can include the following steps:

The UE receives a configuration for an association between a Layer 1 destination ID and a reporting of HARQ-ACK information for a TB in a PSSCH reception.

The UE receives PSCCH and detects a SCI format included in the PSCCH reception. From the detected SCI format, the UE can obtain a Layer 1 destination ID and decode a TB in a PSSCH reception according to the detected SCI format.

The UE determines a HARQ-ACK information reporting method and configuration based on the decoded Layer 1 destination ID.

The UE generates HARQ-ACK information for the decoding outcome of the TB in the PSSCH reception and provides the HARQ-ACK information through a PSFCH transmission according to the configuration for reporting HARQ-ACK information.

Therefore, two HARQ-ACK information reporting methods can be provided for groupcast PSSCH transmission. Reporting NACK-only can be applicable, for example, to the case where a number of UEs receiving the PSSCH is large and configuration of a dedicated PSFCH resource/sequence to each UE would result to large overhead. Reporting either ACK or NACK can be applicable, for example, to the case where the number of UEs receiving the PSSCH is small and a TB in a PDSCH reception can be correctly decoded, including with potential retransmissions, with large probability.

A UE can report NACK for an incorrect decoding of a TB in a PSSCH reception when some additional conditions are fulfilled, such as an RSRP of a DM-RS in a PSCCH or PSSCH reception being above a threshold, a SINR of a PSCCH or PSSCH reception being above a threshold, or a RSRQ of a DM-RS in a PSCCH or PSSCH reception being above a threshold, or an estimated distance between the Tx UE and the Rx UE being below a threshold.

A UE receiving a PSSCH can use a reference signal received power (RSRP) to determine whether or not to report HARQ-ACK information for a TB reception in the PSSCH. The RS can be a DM-RS in a PSCCH reception providing a SCI format scheduling the PSSCH reception or a DM-RS in the PSSCH reception. If the RSRP is above a threshold, that can be provided to the UE by higher layers or be predefined in a system operation, the UE can provide HARQ-ACK information for the TB reception outcome in a PSFCH transmission.

A UE receiving a PSSCH, such as groupcast PSSCH, can determine whether or not to transmit a PSFCH with HARQ-ACK information for a TB decoding in a PSSCH reception depending on whether or not, respectively, a distance from a UE transmitting the PSSCH is smaller than a threshold that can be provided to the UE by higher layers or be defined in a system operation. The UE transmitting the PSSCH can inform a location to the UE receiving the PSCCH, such as a longitude or latitude, and the UE receiving the PSSCH that can use this information to determine a distance from the UE transmitting the PSSCH and whether or not to transmit a PSFCH.

A UE receiving a PSSCH can determine whether or not to transmit a PSFCH with HARQ-ACK information for a TB decoding in a PSSCH reception depending on whether or not, respectively, a signal-to-interference and noise ratio (SINR), or a reference signal received quality (RSRQ), is larger than a threshold that can be provided to the UE by higher layers or can be defined in a system operation. The SINR or RSRQ can be determined from a DM-RS of a PSCCH reception providing a SCI format scheduling the PSSCH reception or of the PSSCH reception.

A UE transmitting a PSSCH can include partial of full information of the UE location, for example in the SCI format scheduling the PSSCH transmission or in the PSSCH transmission. A UE receiving the PSSCH can use both location information and a RSRP or RSRQ measurement to determine, as previously described, whether or not to transmit a PSFCH with HARQ-ACK information for a decoding outcome of a TB in the PSSCH reception.

Whether or not a UE reports HARQ-ACK information for a decoding of a TB provided by the PSSCH can also be conditioned to depend on one or more of the following:

A distance between a first UE transmitting the PSSCH and a second UE receiving the PSSCH is smaller than a distance threshold, and a RSRP of the PSSCH (or of the PSCCH providing a SCI format scheduling the PSSCH) is above a RSRP threshold. For example, the second UE can derive the RSRP threshold from the calculated distance. The second UE can first calculate a distance L from the first UE and obtain a distance threshold, $Thres_L$, according to a configuration. Then, the second UE can calculate a threshold $Thres=f(L)$ as a function of the calculated distance and measure a RSRP of a DM-RS in the PSSCH (or PSCCH) reception $RSRP_{PSSCH}$. When $RSRP_{PSSCH} \geq Thres$ and $L \leq Thres_L$, the second UE transmits a PSFCH with HARQ-ACK information for a decoding of a TB in the PSSCH reception; otherwise, the second UE does not transmit a PSFCH with the HARQ-ACK information.

A RSRP of a DM-RS in a PSSCH (or PSCCH) reception by a second UE is above a threshold derived from a calculated distance from a first UE transmitting the PSSCH. In one example, the second UE first calculates a distance from the first UE, L. Then, the second UE calculates a threshold $Thres=f(L)$ based on the calculated distance, where $f(.)$ is a function that associates the distance with the threshold. Then, the second UE measures the RSRP of a DM-RS in the PSSCH (or PSCCH) reception $RSRP_{PSSCH}$. When $RSRP_{PSSCH} \geq Thres$, the second UE transmits a PSFCH with HARQ-ACK information; otherwise, the second UE does not transmit a PSFCH with HARQ-ACK information.

A UE transmitting a PSSCH can include one or more of the following in a SCI format scheduling the PSSCH transmission:
- a field, for example with size of 6 bits, providing a value representing a number of seconds in the UE longitude value.
- a field, for example with size of 6 bits, providing a value representing a number of seconds in the UE longitude value.
- A field jointly representing values of seconds in the UE longitude and latitude values.

In unicast transmission, a sidelink pathloss between a first UE transmitting a PSSCH and a second UE receiving the PSSCH can be known to the second UE so that the second UE can consider the pathloss in determining a power for a PSFCH transmission. For a groupcast PSSCH transmission, a sidelink pathloss between the first UE and the second UE may not be known by the second UE and the second UE can only use an uplink pathloss from a serving gNB when determining a PSFCH transmission power.

For determining a power for a PSFCH transmission to report HARQ-ACK information in response to a decoding of a TB in a PSSCH reception, a second UE can measure a pathloss from a serving gNB or from a first UE that transmits the PSSCH and receives the PSFCH. The second UE can determine the PSFCH transmission power based on one or more of the following:
  The pathloss from the serving gNB (uplink pathloss), when the second UE is configured to use the pathloss from the serving gNB;
  The pathloss from the first UE (sidelink pathloss), when the second UE is configured to use the pathloss from the first UE;
  The transmission type of the PSSCH, for example, unicast or groupcast transmission;
  The HARQ-ACK information reporting configuration, such as only for reporting NACK or for reporting either ACK or NACK.

Figure 10:
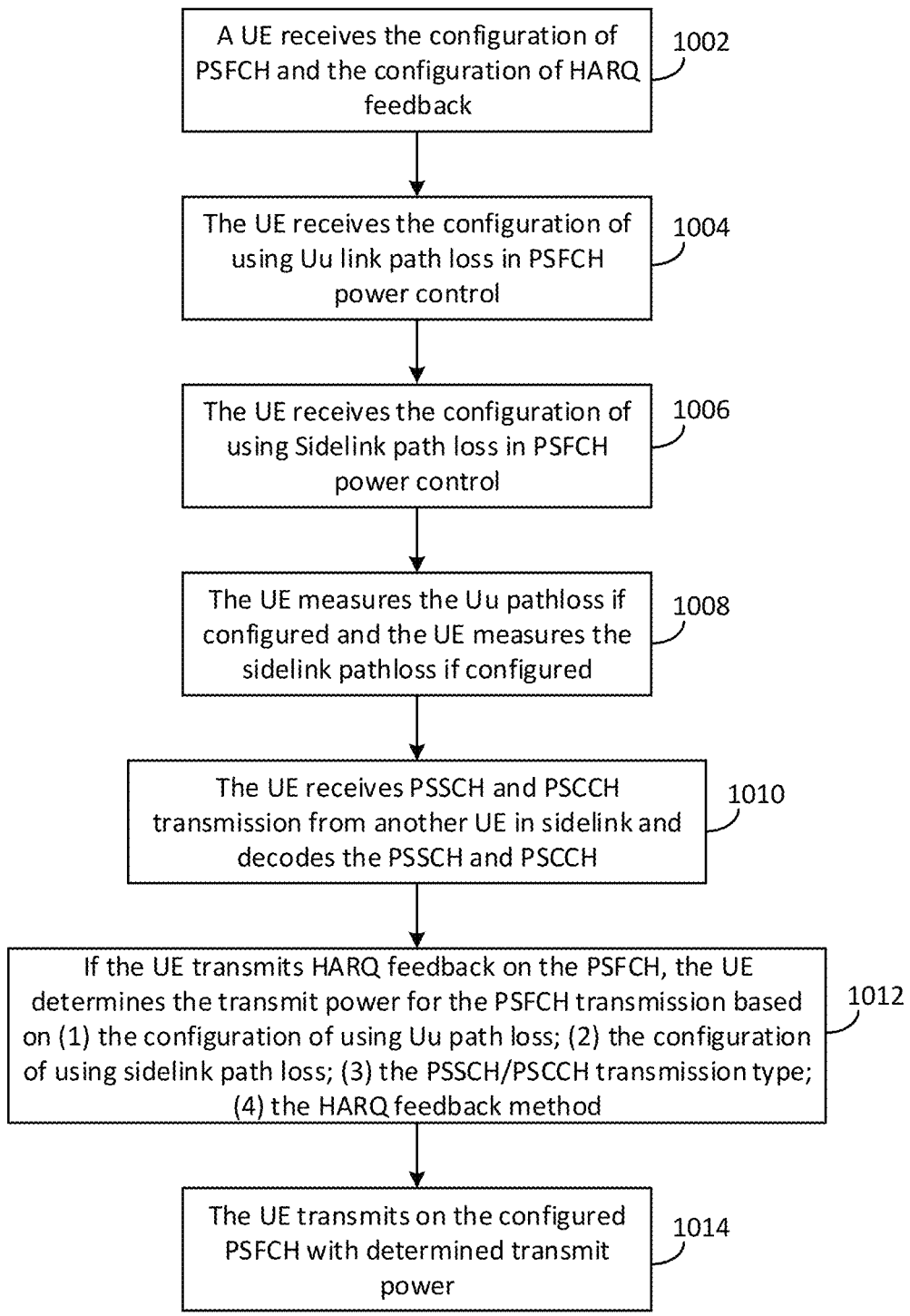
FIG. 10 illustrates a PSFCH power control procedure according to various embodiments of the present disclosure.

FIG. 10 illustrates a PSFCH power control procedure according to various embodiments of the present disclosure.

A UE receives a configuration for PSFCH transmission that can include a configuration of time and frequency resources and a configuration for HARQ-ACK information reporting such as, for example, whether to report NACK-only or either ACK or NACK for a groupcast PSSCH reception 1002. The UE also receives a configuration to measure a pathloss from a serving gNB 1004, for example when the UE is in coverage of the serving gNB. The configuration can also a target power level through a setting of an OLPC parameter, a scaling factor for the pathloss, and a reference signal, such as a CSI-RS or a SS/PBCH block, for pathloss measurements. The UE can also receive a configuration for pathloss measurement from a UE transmitting the PSSCH 1006 and the configuration can include same parameters as for measuring a pathloss from the gNB with the exception that a reference signal can be predetermined to be a DM-RS of the PSSCH (or of a PSCCH that provides a SCI format scheduling the PSSCH reception). The UE measures the uplink pathloss if configured, and the sidelink pathloss if configured 1008. The UE receives PSCCH and PSSCH 1010 and determines whether or not to transmit a PSFCH with HARQ-ACK information for a decoding of a TB in the PSSCH. The UE can determine a power for a PSFCH transmission based on one or more of: (1) the configuration of whether or not to use pathloss from the serving gNB, (2) the configuration of whether or not to use pathloss from the UE that transmitted the PSSCH, (3) whether the PSFCH is in response to a unicast or groupcast PSSCH reception, and (4) whether the HARQ-ACK information in the PSFCH is only NACK or either ACK or NACK 1012. The UE transmits the PSFCH with determined power 1014.

In a first approach for determining a power of a PSFCH transmission in response to a PSSCH reception, when a UE is configured to use both a pathloss to a serving gNB and a pathloss to a UE transmitting the PSSCH, the UE determines the PSFCH transmission power $P_{PSFCH}$ as:

$$P_{PSFCH} = \min\begin{Bmatrix} P_{CMAX}, \\ P_{O\_PSFCH,SL} + 10\log_{10}(2^{\mu} \times M_{PSFCH}) + \alpha_{SL} \times PL_{SL}, \\ P_{O\_PSFCH,Uu} + 10\log_{10}(2^{\mu} \times M_{PSFCH}) + \alpha_{Uu} \times PL_{Uu}, \end{Bmatrix}$$

$P_{CMAX}$ is a maximum transmission power.

$M_{PSFCH}$ is a number of resource blocks for the PSFCH transmission and $\mu$ is a subcarrier spacing (SCS) configuration, where $\mu=0, 1, 2, 3$ for SCS of 15 kHz, 30 kHz, 60 kHz and 120 kHz, respectively.

$P_{O\_PSFCH,SL}$ and $\alpha_{SL}$ are an OLPC power setting for the sidelink and a sidelink pathloss scaling factor, respectively, and are provided by higher layers.

$P_{O\_PSFCH,Uu}$ and $\alpha_{Uu}$ are an OLPC power setting for the uplink and an uplink pathloss scaling factor, respectively, and are provided by higher layers.

$PL_{SL}$ is the sidelink pathloss between the UE transmitting the PSSCH and the UE transmitting the PSFCH.

$PL_{Uu}$ is the uplink pathloss between the serving gNB and the UE transmitting the PSFCH.

The first approach for determining a power of a PSFCH transmission power from a UE can be applicable when the UE can determine a pathloss to a serving gNB and a pathloss to a UE transmitting a corresponding PSSCH.

In a second approach for determining a power of a PSFCH transmission in response to a PSSCH reception, a UE uses only a pathloss from a UE transmitting the PSSCH and determines the PSFCH transmission power $P_{PSFCH}$ as:

$$P_{PSFCH} = \min\left\{ \begin{array}{l} P_{CMAX}, \\ P_{O\_PSFCH,SL} + 10\log_{10}(2^{\mu} \times M_{PSFCH}) + \alpha_{SL} \times PL_{SL} \end{array} \right\}$$

The second approach for determining a power of a PSFCH transmission power from a UE can be applicable when the UE is out of coverage from a serving gNB and can only determine a pathloss from the UE transmitting the PSSCH.

In a third approach for determining a power of a PSFCH transmission in response to a PSSCH reception, a UE can use a pathloss from a serving gNB and determines the PSFCH transmission power $P_{PSFCH}$ as:

$$P_{PSFCH} = \min\left\{ \begin{array}{l} P_{CMAX}, \\ P_{O\_PSFCH,Uu} + 10\log_{10}(2^{\mu} \times M_{PSFCH}) + \alpha_{Uu} \times PL_{Uu} \end{array} \right\}$$

The third approach for determining a power of a PSFCH transmission power from a UE can be applicable, for example, when the PSSCH transmission is a groupcast one and the UE does not know a pathloss from the UE transmitting the PSSCH.

A pathloss for determining a power for a PSFCH transmission from a UE can be configured to the UE by higher layers or be predetermined in a system operation.

When the UE does not include a pathloss for determining a power of a PSFCH transmission, $P_{PSFCH}=P_{CMAX}$ When the UE includes pathloss from a serving gNB for determining a power of a PSFCH transmission, $$P_{PSFCH} = \min\left\{ \begin{array}{l} P_{CMAX}, \\ P_{O\_PSFCH,Uu} + 10\log_{10}(2^{\mu} \times M_{PSFCH}) + \alpha_{Uu} \times PL_{Uu} \end{array} \right\}$$

When the UE includes pathloss from a UE transmitting a PSSCH for determining a power of a PSFCH transmission, $$P_{PSFCH} = \min\left\{ \begin{array}{l} P_{CMAX}, \\ P_{O\_PSFCH,SL} + 10\log_{10}(2^{\mu} \times M_{PSFCH}) + \alpha_{SL} \times PL_{SL} \end{array} \right\}$$

When the UE includes both pathloss from a serving gNB and from a UE transmitting a PSSCH for determining a power of a PSFCH transmission, $$P_{PSFCH} = \min\left\{ \begin{array}{l} P_{CMAX}, \\ P_{O\_PSFCH,SL} + 10\log_{10}(2^{\mu} \times M_{PSFCH}) + \alpha_{SL} \times PL_{SL}, \\ P_{O\_PSFCH,Uu} + 10\log_{10}(2^{\mu} \times M_{PSFCH}) + \alpha_{Uu} \times PL_{Uu}, \end{array} \right\}$$

A UE can additionally determine a power for a PSFCH transmission depending on a PSSCH transmission type and/or a HARQ-ACK information reporting configuration.

The PSSCH transmission type can be unicast or groupcast. For a groupcast PSSCH transmission, HARQ-ACK information can be either only NACK or can be ACK or NACK. For example, first and second values of $P_{O\_PSFCH,Uu}$ can be provided by higher layers to the UE for respectively determining a power of a first PSFCH transmission providing HARQ-ACK information for unicast PSSCH reception and a power of a second PSFCH transmission providing HARQ-ACK information for groupcast PSSCH reception. Using a different power for a PSFCH transmission depending on the PSSCH transmission type enable a different reception reliability for corresponding HARQ-ACK information.

For a groupcast PSSCH reception by a UE with a corresponding PSFCH transmission with HARQ-ACK information having only NACK value, a PSFCH resource can be shared by UEs in the group. Therefore, a signal received by the UE transmitting the PSSCH in the PSFCH resource is the combination of a signal, such as a sequence, transmitted from one or multiple UEs. Therefore, for determining a PSFCH transmission power, a UE can only consider a pathloss from a serving gNB. When the UE is not configured to include a pathloss from the serving gNB in determining a PSFCH transmission power, $P_{PSFCH}=P_{CMAX}$. When the UE is configured to include a pathloss from the serving gNB in determining a PSFCH transmission power, $$P_{PSFCH} = \min\left\{ \begin{array}{l} P_{CMAX}, \\ P_{O\_PSFCH,Uu} + 10\log_{10}(2^{\mu} \times M_{PSFCH}) + \alpha_{Uu} \times PL_{Uu} \end{array} \right\}.$$

For a groupcast PSSCH transmission where each UE in a corresponding group of UEs provides HARQ-ACK information with either ACK or NACK, a UE can be provided a dedicated PSFCH resource for a PSFCH transmission. A PSFCH resource can be defined by a slot in the time domain, an RB in the frequency domain, and a sequence/cyclic shift pair in the code domain. Multiple UEs can have a same resource in time and frequency and use different sequences/cyclic short pairs for a PSFCH transmission. In such case, there would exist inter-UE interference from the PSFCH transmission because multiple UEs would transmit PSFCH sequences in the same PSFCH time and frequency resource. In such case, a UE may additionally consider a sidelink pathloss for determining a power for a PSFCH transmission. When the UE is not configured to include a pathloss for determining a PSFCH transmission power, $P_{PSFCH}=P_{CMAX}$. When the UE is configured to include pathloss from a serving gNB, $$P_{PSFCH} = \min\left\{ \begin{array}{l} P_{CMAX}, \\ P_{O\_PSFCH,Uu} + 10\log_{10}(2^{\mu} \times M_{PSFCH}) + \alpha_{Uu} \times PL_{Uu} \end{array} \right\}.$$

When the UE is configured to include pathloss from a UE transmitting the PSSCH, $$P_{PSFCH} = \min\left\{ \begin{array}{l} P_{CMAX}, \\ P_{O\_PSFCH,SL} + 10\log_{10}(2^{\mu} \times M_{PSFCH}) + \alpha_{SL} \times PL_{SL} \end{array} \right\}.$$

When the UE is configured to include both pathloss from a serving gNB and a pathloss from a UE transmitting the PSSCH, $$P_{PSFCH} = \min\begin{Bmatrix} P_{CMAX}, \\ P_{O\_PSFCH,SL} + 10\log_{10}(2^\mu \times M_{PSFCH}) + \alpha_{SL} \times PL_{SL}, \\ P_{O\_PSFCH,Uu} + 10\log_{10}(2^\mu \times M_{PSFCH}) + \alpha_{Uu} \times PL_{Uu}, \end{Bmatrix}$$

When a UE transmits a PSFCH to report only NACK, a PSFCH transmission power can be different than when a UE transmits a PSFCH to report either ACK or NACK. In the former case a bit-error-rate (BER) is a corresponding one for a modulation with on-off keying (OOK) while in the latter case a BER is a corresponding one for BPSK modulation. Therefore, for a same BER, a higher SINR is used when the UE transmits a PSFCH only for NACK reporting and a PSFCH transmission power can be larger than when the UE transmits a PSFCH either for ACK or NACK reporting by a value that can be provided by higher layers or be defined in a system operation such as 3 dB. Alternatively, $P_{O\_PSFCH,Uu}$ or $P_{O\_PSFCH,SL}$ can be separately provided to a UE for the case that the UE reports only NACK and for the case a UE reports either ACK or NACK in a PSFCH transmission.

Similar principles as for determining a PSFCH transmission power can apply for determining a PSCCH transmission power or PSSCH transmission power.

In a first approach, a UE can determine a power for a PSCCH/PSSCH transmission as $$P_{SL} = \min\begin{Bmatrix} P_{CMAX}, \\ P_{o_{SL}} + 10\log_{10}(M_{SL}) + \alpha_{sL} \times PL_{SL}, \\ P_{o_{Uu}} + 10\log_{10}(M_{SL}) + \alpha_{Uu} \times PL_{Uu}, \end{Bmatrix}$$

where $M_{SL}=2^\mu \times M_{RB}$ and $M_{RB}$ is a number of resource blocks for the PSCCH transmission or for the PSSCH transmission for SCS configuration $\mu$, $P_{o_{SL}}$ and $\alpha_{SL}$ are respectively a OLPC power setting and a pathloss scaling factor on the sidelink, and $P_{o_{Uu}}$ and $\alpha_{U_u}$ are respectively a OLPC power setting and a pathloss scaling factor on the uplink for the PSCCH/PSSCH transmission.

When determining a PSFCH transmission power with respect to the uplink pathloss, a PSFCH interference to uplink transmissions can be controlled as, for example, in case of a shared carrier for uplink and sidelink transmissions. When determining a PSFCH transmission power with respect to the sidelink pathloss, a PSFCH interference to sidelink transmissions can be controlled as, for example, in case of a dedicated carrier for sidelink transmissions. When determining a PSFCH transmission power as the smaller of the ones determined with respect to uplink and sidelink, an interference level can be minimized.

In a variation of the first approach, a UE can determine a PSCCH/PSSCH transmission power as $$P_{SL} = \min\begin{Bmatrix} P_{CMAX}, \\ P_{o_{SL}} + 10\log_{10}(M_{SL}) + \alpha_{SL} \times PL_{SL} + \Delta, \\ P_{o_{Uu}} + 10\log_{10}(M_{SL}) + \alpha_{Uu} \times PL_{Uu}, \end{Bmatrix}$$

where the parameter $\Delta$ adjusts a transmission power according to the MCS level of the PSSCH transmission sidelink. In general, the larger the MCS, the larger the value of $\Delta$.

In a second approach, a UE can determine a power for a PSCCH/PSSCH transmission as $$P_{SL} = \min\begin{Bmatrix} P_{CMAX}, \\ P_o + 10\log_{10}(M_{SL}) + \min\{\alpha_{SL} \times PL_{SL}, \alpha_{Uu} \times PL_{Uu}\} \end{Bmatrix}$$

where $P_o$ is an OLPC power setting that is common when the pathloss is determined from a serving gNB or from a UE receiving the PSCCH/PSSCH.

In a variation of the second approach, a UE can determine a power for a PSCCH/PSSCH transmission as $$P_{SL} = \min\begin{Bmatrix} P_{CMAX}, \\ P_o + 10\log_{10}(M_{SL}) + \min\{\alpha_{SL} \times PL_{SL} + \Delta, \alpha_{Uu} \times PL_{Uu}\} \end{Bmatrix}$$

where the parameter $\Delta$ adjusts a transmission power according to the MCS level of the PSSCH transmission sidelink.

In a third approach, a UE can separately determine a power for a PSCCH transmission and a power for a PSSCH transmission. For determining a power of a PSCCH transmission and of a PSSCH transmission, the UE can be provided or be preconfigured separately one or more of the following parameters.

a $P_{O,Uu}$ and $\alpha_{O,Uu}$.

A CSI-RS resource for measuring pathloss from a serving gNB.

$P_{O,SL}$ and $\alpha_{O,SL}$.

A sidelink RS resource for measuring sidelink RSRP to determine a pathloss from a UE receiving the PSCCH/PSSCH.

An approach for determining a PSCCH/PSSCH transmission power depending on whether a corresponding transmission is for broadcast, groupcast, or unicast.

Figure 11:
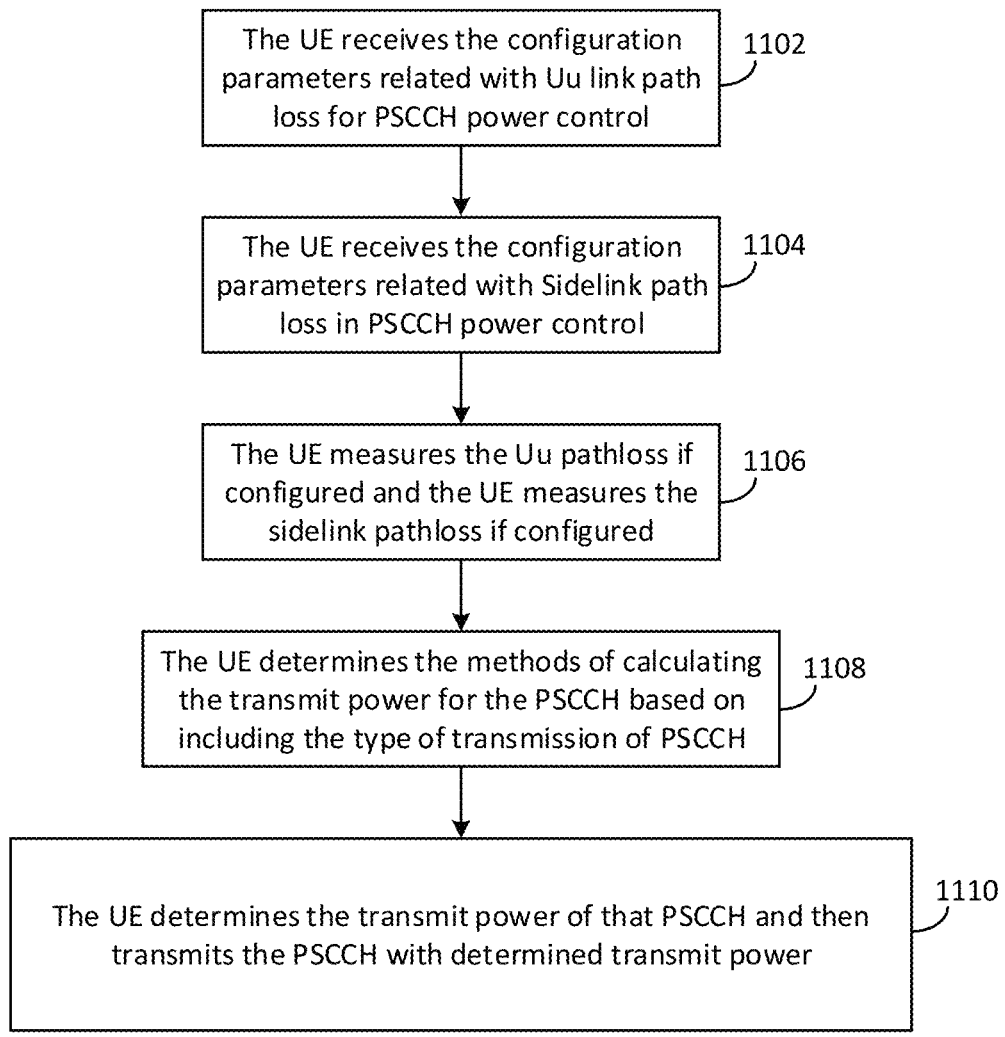
FIG. 11 illustrates a PSCCH power control procedure according to various embodiments of the present disclosure.

FIG. 11 illustrates a PSCCH power control procedure according to various embodiments of the present disclosure.

A UE receives configuration parameters for using a pathloss from a serving gNB for determining a power for a PSCCH transmission 1102. The parameters can be $P_{O,Uu}$ or $\alpha_{O,Uu}$. When $P_{O,Uu}$ or $\alpha_{O,Uu}$ is provided by higher layers, the UE uses the pathloss from the serving gNB in determining a PSCCH transmission power; otherwise, the UE does not use the pathloss from the serving gNB. The UE can also receive a configuration of parameters for using a sidelink pathloss from a UE receiving the PSCCH for determining a PSCCH transmission power 1104. The parameters can be $P_{O,SL}$ and $\alpha_{O,SL}$. When $P_{O,SL}$ or $\alpha_{O,SL}$ is provided by higher layers, the UE can use the sidelink pathloss for determining the PSCCH transmission power; otherwise, the UE does not use the sidelink pathloss. The UE can also receive a configuration indicating a pathloss for the UE to use in determining a PSCCH transmission power 1106. The UE can also determine a PSCCH transmission power based on a PSCCH transmission type 1108. Finally, the UE determines the PSCCH transmission power and transmits the PSCCH 1110.

In one example, a UE can determine a PSCCH transmission over $M_{SL}=2^\mu \times M_{PSCCH}$ RBs as follows:

If the UE is not configured to include pathloss from a serving gNB (uplink pathloss) or from a UE receiving the PSCCH (sidelink pathloss) in determining a PSCCH transmission power, PSCCH power control is disabled and $P_{PSCCH}=P_{CMAX}$.

If the UE is configured to use an uplink pathloss for determining a PSCCH transmission power, $$P_{PSCCH} = \min\begin{Bmatrix} P_{CMAX}, \\ P_{O,Uu} + 10\log_{10}(2^\mu \times M_{PSCCH}) + \alpha_{Uu} \times PL_{Uu} \end{Bmatrix}$$

If the UE is configured to use a sidelink pathloss for determining a PSCCH transmission power, $$P_{PSCCH} = \min\left\{ \begin{array}{l} P_{CMAX}, \\ P_{O,SL} + 10\log_{10}(2^\mu \times M_{PSCCH}) + \alpha_{SL} \times PL_{SL} \end{array} \right\}$$

If the UE is configured to use both uplink and sidelink pathloss for determining a PSCCH transmission power, $$P_{PSCCH} = \min\left\{ \begin{array}{l} P_{CMAX}, \\ P_{O,SL} + 10\log_{10}(2^\mu \times M_{PSCCH}) + \alpha_{SL} \times PL_{SL}, \\ P_{O,Uu} + 10\log_{10}(2^\mu \times M_{PSCCH}) + \alpha_{Uu} \times PL_{Uu}, \end{array} \right\}.$$

Regardless of a PSCCH transmission type, a UE can be configured to use the uplink pathloss for determining a PSCCH transmission power. This is because a PSCCH should be received by all UEs for sensing purposes even when the PSCCH is used to schedule PSSCH for groupcast or unicast transmission.

A UE can use two SCI formats for scheduling a PSSCH reception. For example, a first SCI format can provide information for PSSCH reception at the physical layer, such as for time-frequency resources, DM-RS pattern, MCS, and payload of the second SCI format, while the second SCI format can provide information for processing a TB provided by the PSSCH reception, such as for a HARQ process number, a redundancy version, or a new data indicator and a source ID or destination ID. The UE can determine a transmission power for a first PSCCH providing the first SCI format separately from a transmission power for a second PSCCH providing the second SCI format. For example, for determining a transmission power for the first PSCCH, the UE can use an uplink pathloss while for determining a transmission power for the second PSCCH, the UE can use either or both of the uplink pathloss and the sidelink pathloss. A motivation for a separate determination of a transmission power for the first PSCCH and for the second PSCCH is because the respective first SCI format and the second SCI format can serve different purposes. For example, the first SCI format can also be received for sensing purposes by UEs that do not receive a PSSCH scheduled by the first SCI format while the second SCI format can be received only by the one or more UEs receiving the scheduled PSSCH. For example, for determining a transmission power of the second PSCCH, the UE can use an uplink pathloss when the second SCI format schedules a groupcast PSSCH transmission or also use a sidelink pathloss when the second SCI format schedules a unicast PSSCH transmission.

For determining a PSSCH transmission power a UE can be configured or preconfigured with one or more of the following parameters:

a $P_{O,Uu}$ for setting a target power level on the uplink and a $\alpha_{O,Uu}$ for scaling an uplink pathloss.

A downlink CSI-RS resource for measuring uplink pathloss.

a $P_{O,SL}$ for setting a target power level on the sidelink and a $\alpha_{O,SL}$ for scaling a sidelink pathloss.

A sidelink RS resource for measuring sidelink RSRP to calculate a sidelink pathloss.

A SCS configuration for the resource pool that can be used for determining a total transmission bandwidth.

A power control method such as for determining a PSSCH transmission power based on a PSSCH transmission.

For example, a different power control setting can apply for determining a PSSCH transmission power for broadcast, groupcast and unicast.

Figure 12:
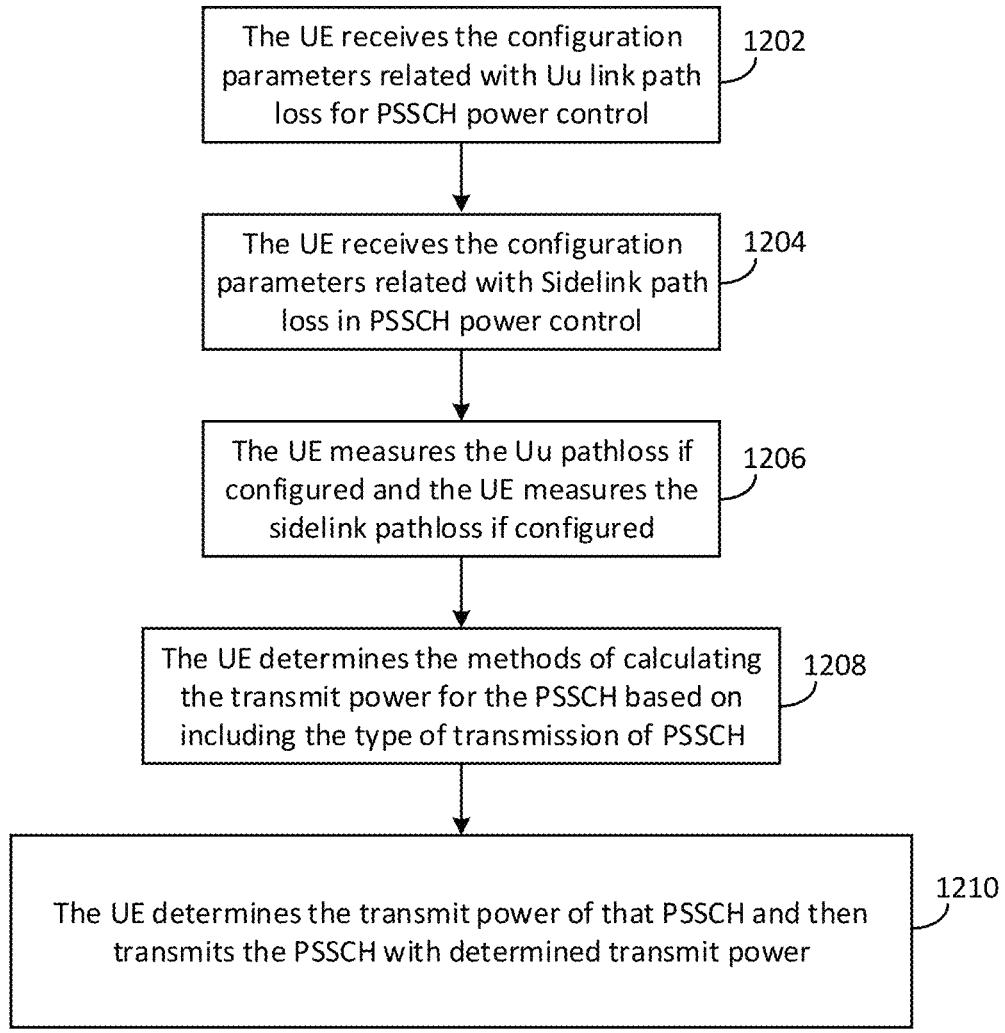
FIG. 12 illustrates a PSSCH power control procedure according to various embodiments of the present disclosure.

FIG. 12 illustrates a PSSCH power control procedure according to various embodiments of the present disclosure.

A UE receives a configuration of parameters, such as be $P_{O,Uu}$ and $\alpha_{O,Uu}$, for using an uplink pathloss for determining a PSSCH transmission power 1202; otherwise, when those parameters are not provided, the UE does not use an uplink pathloss for determining a PSSCH transmission power. The UE can also receive configuration parameters, such as $P_{O,SL}$ and $\alpha_{O,SL}$, for using a sidelink pathloss for determining a PSSCH transmission power 1204; otherwise, when those parameters are not provided, the UE does not use a sidelink pathloss for determining a PSSCH transmission power. The UE can measure an uplink pathloss, when the UE is configured to use an uplink pathloss, and a sidelink pathloss, when the UE is configured to use a sidelink pathloss 1206. The UE subsequently identifies a method, when any, for determining a PSSCH transmission power based on a PSSCH transmission type 1208. Finally, the UE determines the PSSCH transmission power and transmits the PSSCH 1210.

A UE procedure for determining a PSSCH transmission power, $P_{PSSCH}$, for a PSSCH transmission over $M_{PSSCH}$ resource blocks using SCS configuration $\mu$ can be as follows:

When the UE is not configured to use an uplink pathloss or a sidelink pathloss, PSSCH power control is disabled and $P_{PSSCH} = P_{CMAX}$ When the UE is configured to use an uplink pathloss, $$P_{PSSCH} = \min\left\{ \begin{array}{l} P_{CMAX}, \\ P_{O,Uu} + 10\log_{10}(2^\mu \times M_{PSSCH}) + \alpha_{Uu} \times PL_{Uu} \end{array} \right\}.$$

When the UE is configured to use a sidelink pathloss, $$P_{PSSCH} = \min\left\{ \begin{array}{l} P_{CMAX}, \\ P_{O,SL} + 10\log_{10}(2^\mu \times M_{PSSCH}) + \alpha_{SL} \times PL_{SL} \end{array} \right\}$$

When the UE is configured to use both uplink pathloss and sidelink pathloss $$P_{PSSCH} = \min\left\{ \begin{array}{l} P_{CMAX}, \\ P_{O,SL} + 10\log_{10}(2^\mu \times M_{PSSCH}) + \alpha_{SL} \times PL_{SL}, \\ P_{O,Uu} + 10\log_{10}(2^\mu \times M_{PSSCH}) + \alpha_{Uu} \times PL_{Uu}, \end{array} \right\}.$$

A UE can also determine a PSSCH transmission power according to a QoS or service priority level of a TB provided by the PSSCH. The UE can apply a larger power for a PSSCH transmission that includes a TB with higher QoS requirement or higher service priority level. The UE can be provided by higher layers an association between power control parameters and a QoS, or priority level, of a TB. For example, a UE can be provided an association as in Table 5 for a mapping between QoS level (priority level) and power control parameters.

TABLE 5

Mapping between service priority level and power control parameters

| Index | QoS level (service priority level) | Power control parameters |
|---|---|---|
| 00 | 0 | $\{P_{O,Uu,0}, \alpha_{Uu,0}, P_{O_{PSSCH},SL,0}, \alpha_{SL,0}\}$ |
| 01 | 1 | $\{P_{O,Uu,1}, \alpha_{Uu,1}, P_{O_{PSSCH},SL,1}, \alpha_{SL,1}\}$ |
| 10 | 2 | $\{P_{O,Uu,2}, \alpha_{Uu,2}, P_{O_{PSSCH},SL,2}, \alpha_{SL,2}\}$ |
| 11 | 3 | $\{P_{O,Uu,3}, \alpha_{Uu,3}, P_{O_{PSSCH},SL,3}, \alpha_{SL,3}\}$ |

Figure 13:
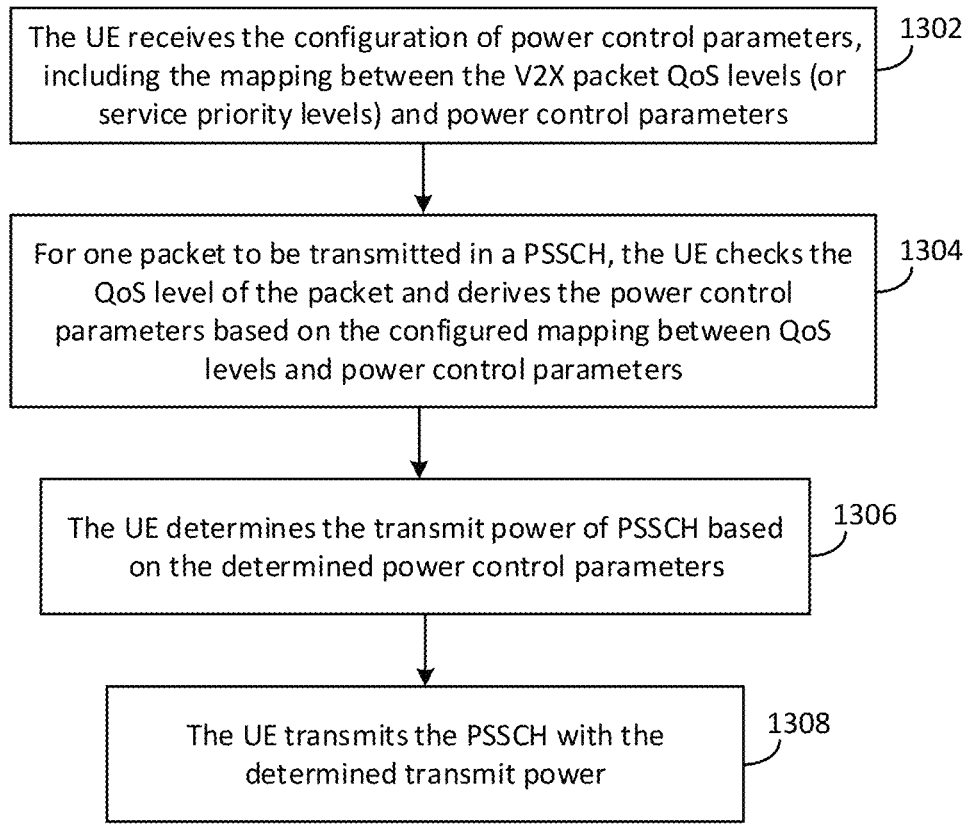
FIG. 13 illustrates a procedure for determining a PSSCH transmission power according to a mapping between a service priority type for a TB provided by the PSSCH transmission and parameters determining a PSSCH transmission power according to various embodiments of the present disclosure.

FIG. 13 illustrates a procedure for determining a PSSCH transmission power according to a mapping between a service priority type for a TB provided by the PSSCH transmission and parameters determining a PSSCH transmission power according to various embodiments of the present disclosure.

A UE determines the priority level of a TB to be included in a PSSCH transmission 1302 and derives power control parameters according to a mapping between QoS level and power control parameters 1304. Then, the UE determines a PSSCH transmission power 1306 and transmits the PSSCH with the determined power 1308. This procedure is also applicable for determining a power of a PSCCH transmission.

A UE can also determine a PSSCH transmission power according to a channel congestion level. The UE can first measure the congestion level of a channel for the PSSCH transmission and can apply a lower maximum PSSCH transmission power for larger channel congestion levels. The UE first measures a channel congestion level and then derives a maximum PSSCH transmission power according to a mapping between the channel congestion level and a maximum PSSCH transmission power.

The UE can also be provided by higher layers an association between one or more PSSCH power control parameters, such as a maximum transmission power, and a corresponding channel congestion level, for example as in Table 6.

TABLE 6

Association between channel congestion level and PSSCH power control parameters

| Index | Sidelink Channel Congestion level | Power control parameters |
|---|---|---|
| 00 | Level 0 | $\{P_{CMAX,0}, P_{O,SL,0}, \alpha_{SL,0}\}$ |
| 01 | Level 1 | $\{P_{CMAX,1}, P_{O,SL,1}, \alpha_{SL,1}\}$ |
| 10 | Level 2 | $\{P_{CMAX,2}, P_{O,SL,2}, \alpha_{SL,2}\}$ |
| 11 | Level 3 | $\{P_{CMAX,3}, P_{O,SL,3}, \alpha_{SL,3}\}$ |

Figure 14:
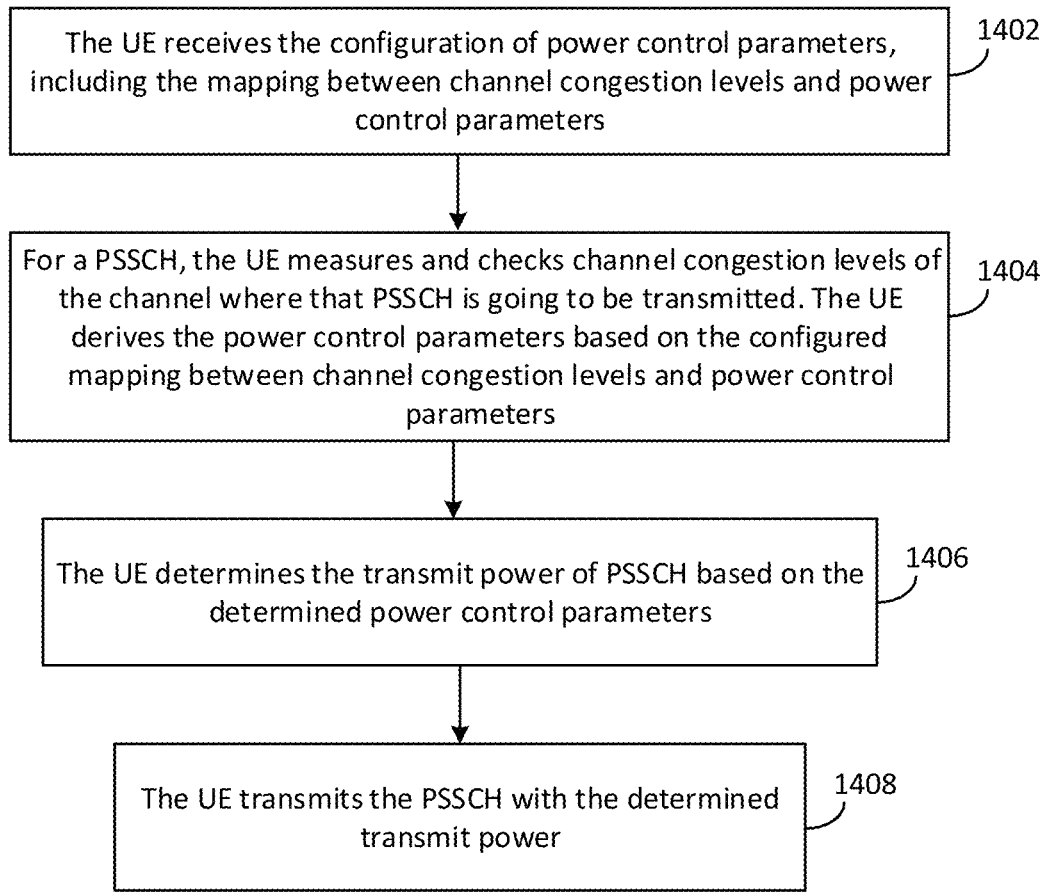
FIG. 14 illustrates a procedure for a UE to determine a PSSCH transmission power based on a mapping between a channel congestion level and parameters of a power control process for a PSSCH transmission according to various embodiments of the present disclosure.

FIG. 14 illustrates a procedure for a UE to determine a PSSCH transmission power based on a mapping between a channel congestion level and parameters of a power control process for a PSSCH transmission according to various embodiments of the present disclosure.

A UE is provided by higher layers an association among channel congestion levels and parameter values for determining a PSSCH transmission power 1402. The UE determines a channel congestion level and then derives power control parameters according to the mapping among channel congestion levels and power control parameters 1406. The UE then determines a PSSCH transmission power based on the derived power control parameters 1408 and transmit the PSSCH with the determined power 1410. This procedure is also applicable for determining a power of a PSCCH transmission.

A UE can transmit PSCCH and PSSCH using time division multiplexing (TDM) or frequency division multiplexing (FDM) or both FDM and TDM.

Figure 15:
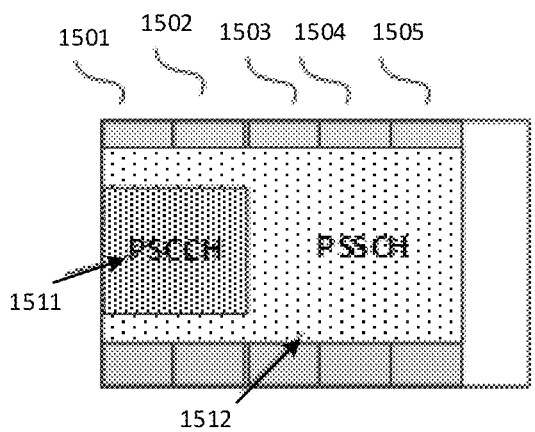
FIG. 15 illustrates a multiplexing of PSCCH and PSSCH transmissions from a UE using both TDM and FDM according to various embodiments of the present disclosure.

FIG. 15 illustrates a multiplexing of PSCCH and PSSCH transmissions from a UE using both TDM and FDM according to various embodiments of the present disclosure.

For symbols 1501 and 1502, a UE transmits both PSCCH 1511 and PSSCH 1512 in different resource blocks. For symbols 1503, 1504, and 1505, the UE transmits only PSSCH 1512. The PSCCH 1511 includes a SCI format providing a configuration for the transmission of PSSCH 1512.

For a PSCCH transmission and a PSSCH transmission as in FIG. 15, a UE can determine PSCCH and PSSCH transmission powers for symbols, such as 1501 and 1502, where PSCCH and PSSCH transmissions are FDM, and for symbols, such as 1503-1505, where the UE transmits only PSSCH.

A UE can be provided by higher layers, or be preconfigured, with one or more of the following parameters for determining a PSCCH transmission power and a PSSCH transmission power.

$P_{O,Uu}$ and $\alpha_{O,Uu}$.

A downlink CSI-RS resource, or a SS/PBCH block, for measuring uplink pathloss.

$P_{O,SL}$ and $\alpha_{O,SL}$.

One sidelink RS resource for measuring sidelink RSRP to calculate a sidelink pathloss.

A SCS configuration for determining a total bandwidth for a PSCCH transmission or for a PSSCH transmission.

Power control method, when the UE uses different parameters for determining a PSCCH transmission power or a PSSCH transmission power for broadcast, groupcast and unicast.

In a first approach, the UE can determine a power for a PSCCH transmission and a power for a PSSCH transmission as follows.

When the UE is not configured to use an uplink pathloss or a sidelink pathloss and for FDM of PSCCH and PSSCH transmissions, $$P_{PSCCH} = 10 \times \log_{10}\left(\frac{\beta \times M_{PSCCH}}{M_{PSSCH,0} + \beta \times M_{PSCCH}}\right) + P_{CMAX},$$

$$P_{PSSCH,0} = 10 \times \log_{10}\left(\frac{M_{PSSCH,0}}{M_{PSSCH,0} + \beta \times M_{PSCCH}}\right) + P_{CMAX}$$

When the UE is not configured to use an uplink pathloss or a sidelink pathloss and for TDM of PSCCH and PSSCH transmissions, $$P_{PSCCH,1} = P_{PSCCH,0} + 10 \times \log_{10}\left(\frac{M_{PSSCH,1}}{M_{PSSCH,0}}\right)$$

in a first alternative and $P_{PSCCH,1} = P_{CMAX}$ in a second alternative.

When the UE is configured to use uplink pathloss for determining a PSCCH transmission power and a PSSCH transmission power and for FDM of PSCCH and PSSCH transmissions $$P_{PSCCH} = 10 \times \log_{10}\left(\frac{\beta \times M_{PSCCH}}{M_{PSSCH,0} + \beta \times M_{PSCCH}}\right) + \min$$

$$\left\{ \begin{array}{l} P_{CMAX}, \\ P_{O,Uu} + 10\log_{10}(2^\mu \times (M_{PSCCH} + 2^\mu \times (M_{PSSCH,0})) + \alpha_{Uu} \times PL_{Uu} \end{array} \right\}$$

and $$P_{PSSCH,0} = 10 \times \log_{10}\left(\frac{M_{PSCCH,0}}{M_{PSSCH,0} + \beta \times M_{PSCCH}}\right) +$$

$$\min\left\{ \begin{array}{l} P_{CMAX}, \\ P_{O,Uu} + 10\log_{10}(2^\mu \times (M_{PSCCH} + 2^\mu \times (M_{PSSCH,0})) + \alpha_{Uu} \times PL_{Uu} \end{array} \right\}$$

When the UE is configured to use uplink pathloss for determining a PSCCH transmission power and a PSSCH transmission power and for TDM of PSCCH and PSSCH transmissions, $$P_{PSCCH,1} = P_{PSCCH,0} + 10 \times \log_{10}\left(\frac{M_{PSSCH,1}}{M_{PSSCH,0}}\right)$$

in a first alternative or $$P_{PSSCH,1} = \min\left\{ \begin{array}{l} P_{CMAX}, \\ P_{O,Uu} + 10\log_{10}(2^\mu \times M_{PSSCH,1}) + \alpha_{Uu} \times PL_{Uu} \end{array} \right\}$$

in a second alternative.

When the UE is configured to use sidelink pathloss for determining a PSCCH transmission power and a PSSCH transmission power and for FDM of PSCCH and PSSCH transmissions, $$P_{PSCCH} = 10 \times \log_{10}\left(\frac{\beta \times M_{PSCCH}}{M_{PSSCH,0} + \beta \times M_{PSCCH}}\right) +$$

$$\min\left\{ \begin{array}{l} P_{CMAX}, \\ P_{O,SL} + 10\log_{10}(2^\mu \times (M_{PSCCH} + 2^\mu \times (M_{PSSCH,0})) + \alpha_{SL} \times PL_{SL} \end{array} \right\}$$

$$P_{PSSCH,0} = 10 \times \log_{10}\left(\frac{M_{PSCCH,0}}{M_{PSSCH,0} + \beta \times M_{PSCCH}}\right) +$$

$$\min\left\{ \begin{array}{l} P_{CMAX}, \\ P_{O,SL} + 10\log_{10}(2^\mu \times (M_{PSCCH} + 2^\mu \times (M_{PSSCH,0})) + \alpha_{SL} \times PL_{SL} \end{array} \right\}$$

When the UE is configured to use sidelink pathloss for determining a PSCCH transmission power and a PSSCH transmission power and for TDM of PSCCH and PSSCH transmissions $$P_{PSCCH,1} = P_{PSCCH,0} + 10 \times \log_{10}\left(\frac{M_{PSSCH,1}}{M_{PSSCH,0}}\right)$$

in a first alternative or $$P_{PSSCH,1} = \min\left\{ \begin{array}{l} P_{CMAX}, \\ P_{O,SL} + 10\log_{10}(2^\mu \times M_{PSSCH,1}) + \alpha_{SL} \times PL_{SL} \end{array} \right\}$$

in a second alternative.

When the UE is configured to use both uplink pathloss and sidelink pathloss for determining a PSCCH transmission power and a PSSCH transmission power and for FDM of PSCCH and PSSCH transmissions, $$P_{PSCCH} = 10 \times \log_{10}\left(\frac{\beta \times M_{PSCCH}}{M_{PSSCH,0} + \beta \times M_{PSCCH}}\right) + \min$$

$$\left\{ \begin{array}{l} P_{CMAX}, \\ P_{O,SL} + 10\log_{10}(2^\mu \times (M_{PSCCH} + 2^\mu \times (M_{PSSCH,0})) + \alpha_{SL} \times PL_{SL}, \\ P_{O,Uu} + 10\log_{10}(2^\mu \times (M_{PSCCH} + 2^\mu \times (M_{PSSCH,0})) + \alpha_{Uu} \times PL_{Uu}, \end{array} \right\}$$

$$P_{PSSCH,0} = 10 \times \log_{10}\left(\frac{M_{PSCCH,0}}{M_{PSSCH,0} + \beta \times M_{PSCCH}}\right) +$$

$$\min\left\{ \begin{array}{l} P_{CMAX}, \\ P_{O,SL} + 10\log_{10}(2^\mu \times (M_{PSCCH} + 2^\mu \times (M_{PSSCH,0})) + \alpha_{SL} \times PL_{SL}, \\ P_{O,Uu} + 10\log_{10}(2^\mu \times (M_{PSCCH} + 2^\mu \times (M_{PSSCH,0})) + \alpha_{Uu} \times PL_{Uu}, \end{array} \right\}$$

When the UE is configured to use both uplink pathloss and sidelink pathloss for determining a PSCCH transmission power and a PSSCH transmission power and for TDM of PSCCH and PSSCH transmissions, $$P_{PSCCH,1} = P_{PSCCH,0} + 10 \times \log_{10}\left(\frac{M_{PSSCH,1}}{M_{PSSCH,0}}\right)$$

in a first alternative or $$P_{PSSCH,1} = \min\left\{ \begin{array}{l} P_{CMAX}, \\ P_{O,SL} + 10\log_{10}(2^\mu \times M_{PSSCH,1}) + \alpha_{SL} \times PL_{SL'} \\ P_{O,Uu} + 10\log_{10}(2^\mu \times M_{PSSCH,1}) + \alpha_{Uu} \times PL_{Uu'} \end{array} \right\}$$

in a second alternative.

In the above equations, $P_{PSCCH}$ is a PSCCH transmission power, $P_{PSSCH,0}$ is a PSSCH transmission power when PSCCH and PSSCH transmissions are FDM, $P_{PSSCH,1}$ is a PSSCH transmission power when PSCCH and PSSCH transmissions are TDM, $M_{PSCCH}$ is a number of resource blocks for the PSSCH transmission, $M_{PSSCH,0}$ is a number of resource blocks for the PSSCH transmission when FDM with a PSCCH transmission, $M_{PSSCH,1}$ is a of resource blocks for the PSSCH transmission when TDM with a PSCCH transmission, and β can be provided by higher layers to control a power allocation ratio between PSCCH and PSSCH.

Additionally, a UE can determine a PSSCH transmission power based on a PSSCH transmission type. For example, when the PSSCH transmission is broadcast or groupcast, the UE can use an uplink pathloss while when the PSSCH transmission is unicast, the UE can use a sidelink pathloss. For a PSSCH transmission power, the UE can use an uplink pathloss regardless of the PSSCH transmission type since PSCCH and broadcast and groupcast PSSCH can be received by a group of UEs while unicast PSSCH can be received only by one UE.

For a broadcast or groupcast transmission, the UE can determine a PSCCH transmission power and a PSSCH transmission power as follows.

When the UE is not configured to use uplink pathloss, power control for PSCCH and for PSSCH transmissions is disabled. Then, for FDM of PSCCH and PSSCH transmissions, $$P_{PSCCH} = 10 \times \log_{10}\left(\frac{\beta \times M_{PSCCH}}{M_{PSSCH,0} + \beta \times M_{PSCCH}}\right) + P_{CMAX},$$

$$P_{PSSCH,0} = 10 \times \log_{10}\left(\frac{M_{PSSCH,0}}{M_{PSSCH,0} + \beta \times M_{PSCCH}}\right) + P_{CMAX}$$

and, for TDM of PSCCH and PSSCH transmissions, $$P_{PSCCH,1} = P_{PSCCH,0} + 10 \times \log_{10}\left(\frac{M_{PSSCH,1}}{M_{PSSCH,0}}\right).$$

When the UE is configured to use uplink pathloss, power control for PSCCH and for PSSCH transmissions is disabled. Then, for FDM of PSCCH and PSSCH transmissions, $$P_{PSCCH} = 10 \times \log_{10}\left(\frac{\beta \times M_{PSCCH}}{M_{PSSCH,0} + \beta \times M_{PSCCH}}\right) + \min$$

$$\left\{\begin{array}{c} P_{CMAX}, \\ P_{O,Uu} + 10\log_{10}(2^\mu \times (M_{PSCCH} + 2^\mu \times (M_{PSSCH,0})) + \alpha_{Uu} \times PL_{Uu} \end{array}\right\}$$

$$P_{PSSCH,0} = 10 \times \log_{10}\left(\frac{M_{PSCCH,0}}{M_{PSSCH,0} + \beta \times M_{PSCCH}}\right) +$$

$$\min\left\{\begin{array}{c} P_{CMAX}, \\ P_{O,Uu} + 10\log_{10}(2^\mu \times (M_{PSCCH} + 2^\mu \times (M_{PSSCH,0})) + \alpha_{Uu} \times PL_{Uu} \end{array}\right\}$$

and for TDM of PSCCH and PSSCH transmissions, $$P_{PSCCH,1} = P_{PSCCH,0} + 10 \times \log_{10}\left(\frac{M_{PSSCH,1}}{M_{PSSCH,0}}\right)$$

in a first alternative, or $$P_{PSSCH,1} = \min\left\{\begin{array}{c} P_{CMAX}, \\ P_{O,Uu} + 10\log_{10}(2^\mu \times M_{PSSCH,1}) + \alpha_{Uu} \times PL_{Uu} \end{array}\right\}$$

in a second alternative.

For a unicast transmission, the UE can determine a PSCCH transmission power and a PSSCH transmission power as follows. When the UE is not configured to use uplink pathloss or sidelink pathloss, power control for PSCCH and PSCCH transmissions is disabled. For FDM of PSCCH and PSSCH transmissions, the UE determines a PSCCH transmission power and a PSSCH transmission power as $$P_{PSCCH} = 10 \times \log_{10}\left(\frac{\beta \times M_{PSCCH}}{M_{PSSCH,0} + \beta \times M_{PSCCH}}\right) + P_{CMAX},$$

$$P_{PSSCH,0} = 10 \times \log_{10}\left(\frac{M_{PSSCH,0}}{M_{PSSCH,0} + \beta \times M_{PSCCH}}\right) + P_{CMAX}.$$

For TDM of PSCCH and PSSCH transmissions, the UE determines a PSCCH transmission power and a PSSCH transmission power as $$P_{PSCCH,1} = P_{PSCCH,0} + 10 \times \log_{10}\left(\frac{M_{PSSCH,1}}{M_{PSSCH,0}}\right)$$

in a first alternative or as $P_{PSCCH,1} = P_{CMAX}$ in a second alternative.

When the UE is configured to use uplink pathloss for determining PSSCH transmit power and for FDM of PSCCH and PSSCH transmissions, the UE a PSCCH transmission power and a PSSCH transmission power as $$P_{PSCCH} = 10 \times \log_{10}\left(\frac{\beta \times M_{PSCCH}}{M_{PSSCH,0} + \beta \times M_{PSCCH}}\right) + \min$$

$$\left\{\begin{array}{c} P_{CMAX}, \\ P_{O,Uu} + 10\log_{10}(2^\mu \times (M_{PSCCH} + 2^\mu \times (M_{PSSCH,0})) + \alpha_{Uu} \times PL_{Uu} \end{array}\right\}$$

$$P_{PSCCH,0} = 10 \times \log_{10}\left(\frac{M_{PSCCH,0}}{M_{PSSCH,0} + \beta \times M_{PSCCH}}\right) +$$

$$\min\left\{\begin{array}{c} P_{CMAX}, \\ P_{O,Uu} + 10\log_{10}(2^\mu \times (M_{PSCCH} + 2^\mu \times (M_{PSSCH,0})) + \alpha_{Uu} \times PL_{Uu} \end{array}\right\}$$

For TDM of PSCCH and PSSCH transmissions, the UE determines a PSCCH transmission power and a PSSCH transmission power as $$P_{PSCCH,1} = P_{PSCCH,0} + 10 \times \log_{10}\left(\frac{M_{PSSCH,1}}{M_{PSSCH,0}}\right)$$

in a first alternative or as $$P_{PSSCH,1} = \min\left\{\begin{array}{c} P_{CMAX}, \\ P_{O,Uu} + 10\log_{10}(2^\mu \times M_{PSSCH,1}) + \alpha_{Uu} \times PL_{Uu} \end{array}\right\}$$

in a second alternative.

When the UE is configured to use sidelink pathloss for determining a PSSCH transmission power, and for FDM of PSCCH and PSSCH transmissions, the UE determines a PSCCH transmission power and a PSSCH transmission power as Step 1: The UE first calculates $$P_{PSSCH,0} = 10 \times \log_{10}\left(\frac{M_{PSCCH,0}}{M_{PSSCH,0} + \beta \times M_{PSCCH}}\right) +$$

$$\min\left\{\begin{array}{c} P_{CMAX}, \\ P_{O,SL} + 10\log_{10}(2^\mu \times (M_{PSCCH} + 2^\mu \times (M_{PSSCH,0})) + \alpha_{SL} \times PL_{SL} \end{array}\right\}$$

$$P_{PSCCH} = P_{CMAX} - P_{PSSCH,0}$$

Step 2: When $$P_{PSCCH} < P_{PSSCH,0} + 10 \times \log_{10}\left(\frac{\beta \times M_{PSCCH}}{M_{PSSCH,0}}\right),$$

the UE calculates $$P_{PSCCH} = 10 \times \log_{10}\left(\frac{\beta \times M_{PSCCH}}{M_{PSSCH,0} + \beta \times M_{PSCCH}}\right) + P_{CMAX} \text{ and}$$

$$P_{PSSCH,0} = 10 \times \log_{10}\left(\frac{M_{PSSCH,0}}{M_{PSSCH,0} + \beta \times M_{PSCCH}}\right) + P_{CMAX}$$

For TDM of PSCCH and PSSCH transmissions, $$P_{PSCCH,1} = P_{PSCCH,0} + 10 \times \log_{10}\left(\frac{M_{PSSCH,1}}{M_{PSSCH,0}}\right)$$

in a first alternative and $$P_{PSSCH,1} = \min\left\{\begin{array}{l} P_{CMAX}, \\ P_{O,SL} + 10\log_{10}(2^\mu \times M_{PSSCH,1}) + \alpha_{SL} \times PL_{SL} \end{array}\right\}$$

in a second alternative.

When the UE is configured to use both uplink pathloss and sidelink pathloss for determining PSSCH transmit power, and for FDM of PSCCH and PSSCH transmissions, $$P_{PSCCH} = 10 \times \log_{10}\left(\frac{\beta \times M_{PSCCH}}{M_{PSSCH,0} + \beta \times M_{PSCCH}}\right) +$$
$$\min\left\{\begin{array}{l} P_{CMAX}, \\ P_{O,Uu} + 10\log_{10}(2^\mu \times (M_{PSCCH} + M_{PSSCH,0})) + \alpha_{Uu} \times PL_{Uu}, \end{array}\right\}$$

$$P_{PSSCH,0} = 10 \times \log_{10}\left(\frac{M_{PSSCH,0}}{M_{PSSCH,0} + \beta \times M_{PSCCH}}\right) +$$
$$\min\left\{\begin{array}{l} P_{CMAX}, \\ P_{O,SL} + 10\log_{10}(2^\mu \times (M_{PSCCH} + M_{PSSCH,0})) + \alpha_{SL} \times PL_{SL}, \\ P_{O,Uu} + 10\log_{10}(2^\mu \times (M_{PSCCH} + M_{PSSCH,0})) + \alpha_{Uu} \times PL_{Uu}, \end{array}\right\}$$

When $P_{PSCCH} + P_{PSSCH,0} > P_{CMAX}$, the UE calculates:

$$P_{PSCCH} = 10 \times \log_{10}\left(\frac{\beta \times M_{PSCCH}}{M_{PSSCH,0} + \beta \times M_{PSCCH}}\right) + P_{CMAX}$$

$$P_{PSSCH,0} = 10 \times \log_{10}\left(\frac{M_{PSSCH,0}}{M_{PSSCH,0} + \beta \times M_{PSCCH}}\right) + P_{CMAX}$$

For TDM of PSCCH and PSSCH transmissions, $$P_{PSCCH,1} = P_{PSCCH,0} + 10 \times \log_{10}\left(\frac{M_{PSSCH,1}}{M_{PSSCH,0}}\right)$$

in a first alternative and $$P_{PSSCH,1} = \min\left\{\begin{array}{l} P_{CMAX}, \\ P_{O,SL} + 10\log_{10}(2^\mu \times M_{PSSCH,1}) + \alpha_{SL} \times PL_{SL}, \\ P_{O,Uu} + 10\log_{10}(2^\mu \times M_{PSSCH,1}) + \alpha_{Uu} \times PL_{Uu}, \end{array}\right\}$$

in a second alternative.

In one approach, a UE can be configured with different/separate power control parameters for a PSCCH transmission and for a PSCCH transmission. In one example, the UE can be separately configured with sidelink power level target $P_{O,SL}$ for a PSCCH and for PSSCH transmission because, for a unicast PSSCH transmission, the PSSCH is received by only one UE while the PSCCH can be received by a group of UEs for purposes that include channel sensing and resource allocation. Then, the UE can be provided a value $P_{O\_PSSCH,SL}$ for PSSCH transmission and a value $P_{O\_PSCCH,SL}$ for a PSCCH transmission.

In one approach, a UE can determine a PSCCH transmission power and a PSSCH transmission power as follows. For determining a PSCCH transmission power, the UE can use an uplink pathloss. For determining a PSSCH transmission power, the UE can consider a PSSCH transmission type. For example, when the PSSCH transmission is unicast, the UE can determine a PSSCH transmission power using both uplink pathloss and sidelink pathloss. For example, when the PSSCH transmission is groupcast or broadcast, the UE can determine a PSSCH transmission power using uplink pathloss.

For a unicast PSSCH transmission, a first UE transmits PSCCH and PSSCH to a second UE and the second UE transmits a PSFCH with corresponding HARQ-ACK information to the first UE. For determining a PSCCH transmission power and a PSSCH transmission power, the first UE can use an uplink pathloss, when the first UE is within a coverage area of a serving gNB, and a sidelink pathloss. The sidelink pathloss can be determined based on a sidelink RSRP report from the second UE. The second UE measures the sidelink RSRP based on a reference signal transmitted from the first UE, such as a DM-RS in a PSCCH transmission or a PSSCH transmission. The first UE calculates the uplink pathloss based on a downlink reference signal such as a CSI-RS or a SS/PBCH block. When the first UE is not provided by higher layers a downlink reference signal to measure a pathloss, the first UE uses the SS/PBCH obtained during initial access to the serving gNB.

For a PSCCH or PSSCH transmission from a first UE to a second UE, when a sidelink RSRP report is not available at the first UE, the first UE can use a preconfigured transmission power that can be associated with QoS or priority level of a TB provided by the PSSCH. Also, the first UE can use only the uplink pathloss for determining a PSCCH or a PSSCH transmission power or, for example when the uplink pathloss is not configured to be used or is not available, use a maximum transmission power $P_{CMAX}$.

Other than a DM-RS associated with a PSCCH transmission or a PSSCH transmission, sidelink transmissions can include at least two types of reference signals; CSI-RS used for sidelink CSI acquisition and phase tracking RS (PTRS) for a UE receiving a PSSCH to estimate and compensate a phase noise.

A PTRS transmission power can be determined based on a corresponding PSSCH transmission power. When a PSSCH transmission power per RE and per layer is $p_1$, a PTRS transmission power per RE is $p_1 + \alpha_{SL\_PTRS}$, where $\alpha_{SL\_PTRS}$ is a PTRS power offset in dB. A power ratio factor $\alpha_{SL\_PTRS}$ between a PTRS and a corresponding PSSCH can depend on a number of layers for the PSSCH transmission and a number of PTRS antenna ports. For example, for a PTRS transmission using one antenna port, $\alpha_{SL\_PTRS} = 0$ dB when a number of layers for a PSSCH transmission is 1, and $\alpha_{SL\_PTRS} = 3$ dB when a number of layers for a PSSCH transmission is 2. A value of $\alpha_{SL\_PTRS}$ can also depend on whether a PSSCH transmission type is unicast, groupcast or broadcast. A value of $\alpha_{SL\_PTRS}$ can also depend on a Qos requirement or priority level of a TB provided by the PSSCH transmission.

A CSI-RS transmission can be triggered by a CSI request field in a SCI format scheduling a PSSCH transmission. A CSI-RS transmission power can be determined based on a power of a PSSCH that is transmitted together with the CSI-RS. When a PSSCH transmission power per RE and per layer is $p_1$, a UE determines a CSI-RS transmission power per RE and per port as $p_1+\alpha_{SL\_CSIRS}$, where $\alpha_{SL\_CSIRS}$ is a power ratio factor between a CSI-RS transmission power and a PSSCH transmission power. The UE determines $\alpha_{SL\_CSIRS}$ depending on a number of layers for a PSSCH transmission. For example, when a number of layers for a PSSCH transmission is 1, $\alpha_{SL\_CSIRS}=0$ dB, or $\alpha_{SL\_CSIRS}=-3$ dB, or $\alpha_{SL\_CSIRS}=-3$ dB when a number of antenna ports for a CSI-RS transmission is respectively 1, or 2, or 4. For example, when a number of layers for a PSSCH transmission is 2, $\alpha_{SL\_CSIRS}=3$ dB, or $\alpha_{SL\_CSIRS}=0$ dB, or $\alpha_{SL\_CSIRS}=0$ dB when a number of antenna ports for a CSI-RS transmission is respectively 1, or 2, or 4.

A UE can also transmit a CSI-RS with a power that depends on a functionality of the CSI-RS transmission. For example, when the CSI-RS transmission is used for CQI and RI reporting, the UE can transmit the CSI-RS with a power that is determined as it was previously described while when the CSI-RS transmission is used for RSRP measurement and sidelink pathloss calculation, the UE can transmit the CSI-RS with a (pre-)configured power.

Although the present disclosure has been described with various embodiments, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A method for operating a user equipment (UE), the method comprising:
   receiving:
      a physical sidelink control channel (PSCCH) that includes a sidelink control information (SCI) format scheduling a reception of a physical sidelink shared channel (PSSCH), and
      the PSSCH that includes a transport block (TB);
   decoding the TB;
   determining whether or not to transmit hybrid automatic repeat request acknowledgement (HARQ-ACK) information for the decoded TB in a physical sidelink feedback channel (PSFCH) based on:
      information by higher layers indicating whether resources for a PSFCH transmission are available or unavailable, and
      an indication by a field in the SCI format responsive to a determination that the information indicates availability of the resources for the PSFCH transmission; and
   transmitting or not transmitting the PSFCH with the HARQ-ACK information based on a result of the determination,
   wherein the UE does not transmit the PSFCH with the HARQ-ACK information when the resources for the PSFCH transmission are indicated as unavailable even when the field indicates reporting of the HARQ-ACK information.

2. The method of claim 1, further comprising determining:
   a PSSCH reception type to be groupcast based on a destination identity field in the SCI format; and
   a HARQ-ACK reporting type, based on a field in the SCI format, to be either a first HARQ-ACK reporting type or a second HARQ-ACK reporting type and the HARQ-ACK information has a NACK value.

3. The method of claim 1, further comprising determining:
   a PSSCH reception type to be groupcast based on a destination identity field in the SCI format; and
   a location enabling transmission of the PSFCH based on a location indication field in the SCI format.

4. The method of claim 1, further comprising determining a PSFCH transmission power $P_{PSFCH}$ as:

$$P_{PSFCH} = \min\left\{\begin{array}{l} P_{CMAX}, \\ P_{O\_PSFCH,Uu} + 10\log_{10}(2^\mu \times M_{PSFCH}) + \alpha_{Uu} \times PL_{Uu} \end{array}\right\},$$

wherein:
   $P_{CMAX}$ is a maximum transmission power,
   $M_{PSFCH}$ is a number of resource blocks and $\mu$ is a subcarrier spacing (SCS) configuration for the PSFCH transmission,
   $P_{O\_PSFCH,Uu}$ is a power value provided by higher layers,
   $\alpha_{Uu}$ is a scaling factor provided by higher layers,
   $PL_{Uu}$ is a pathloss that is calculated from a downlink reception, and
   transmitting the PSFCH comprises transmitting the PSFCH with $P_{PSFCH}$ power.

5. The method of claim 4, further comprising:
   receiving a configuration for first and second values of $P_{O\_PSFCH,Uu}$;
   determining a PSSCH reception type to be either unicast or groupcast based on a destination identity field in the SCI format; and
   transmitting the PSFCH using the first $P_{O\_PSFCH,Uu}$ value when the PSSCH reception type is unicast and using the second $P_{O\_PSFCH,Uu}$ value when the PSSCH reception type is groupcast.

6. The method of claim 1, further comprising:
   determining a PSFCH transmission power $P_{PSFCH}$ as $P_{PSFCH}=P_{CMAX}$ responsive to a determination that a power value $P_{O\_PSFCH,Uu}$ is not provided by higher layers for a determination of a PSFCH transmission power, wherein $P_{CMAX}$ is a maximum transmission power,
   wherein transmitting the PSFCH comprises transmitting the PSFCH with $P_{PSFCH}$ power.

7. The method of claim 1, further comprising:
   determining a PSSCH reception type to be groupcast based on a destination identity field in the SCI format,
   wherein transmitting the PSFCH comprises transmitting the PSFCH with a larger power for a second HARQ-ACK reporting type than for a first HARQ-ACK reporting type.

8. A user equipment (UE) comprising:
   a receiver configured to receive:
      a physical sidelink control channel (PSCCH) that includes a sidelink control information (SCI) format scheduling a reception of a physical sidelink shared channel (PSSCH), and the PSSCH that includes a transport block (TB);
a processor operably connected to the receiver, the processor configured to decode the TB and determine whether or not to transmit hybrid automatic repeat request acknowledgement (HARQ-ACK) information for the decoded TB in a physical sidelink feedback channel (PSFCH) based on:
   information by higher layers indicating whether resources for a PSFCH transmission are available or unavailable, and
   an indication by a field in the SCI format responsive to a determination that the configuration indicates availability of the resources for the PSFCH transmission; and
a transmitter operably connected to the processor, the transmitter configured to transmit or not transmit the PSFCH with the HARQ-ACK information based on a result of the determination,
wherein the transmitter does not transmit the PSFCH with the HARQ-ACK information when the resources for the PSFCH transmission are indicated as unavailable even when the field indicates reporting of the HARQ-ACK information.

9. The UE of claim 8, wherein the processor is further configured to determine:
   a PSSCH reception type to be groupcast based on a destination identity field in the SCI format; and
   a HARQ-ACK reporting type, based on a field in the SCI format, to be either a first HARQ-ACK reporting type or a second HARQ-ACK reporting type and the HARQ-ACK information has a NACK value.

10. The UE of claim 8, wherein the processor is further configured to determine:
   a PSSCH reception type to be groupcast based on a destination identity field in the SCI format; and
   a location enabling transmission of the PSFCH based on a location indication field in the SCI format.

11. The UE of claim 8, wherein:
the processor is further configured to determine a PSFCH transmission power $P_{PSFCH}$ as $$P_{PSFCH} = \min\left\{ \begin{array}{c} P_{CMAX}, \\ P_{O\_PSFCH,Uu} + 10\log_{10}(2^\mu \times M_{PSFCH}) + \alpha_{Uu} \times PL_{Uu} \end{array} \right\},$$

$P_{CMAX}$ is a maximum transmission power,
$M_{PSFCH}$ is a number of resource blocks and $\mu$ is a subcarrier spacing (SCS) configuration for the PSFCH transmission,
$P_{O\_PSFCH,Uu}$ is a power value provided by higher layers,
$\alpha_{Uu}$ is a scaling factor provided by higher layers,
$PL_{Uu}$ is a pathloss that is calculated from a downlink reception; and
the transmitter is configured to transmit the PSFCH with $P_{PSFCH}$ power.

12. The UE of claim 11, wherein:
the receiver is further configured to receive a configuration for first and second values of $P_{O\_PSFCH,Uu}$;
the processor is further configured to determine a PSSCH reception type to be either unicast or groupcast based on a destination identity field in the SCI format; and
the transmitter is configured to transmit the PSFCH using the first $P_{O\_PSFCH,Uu}$ value when the PSSCH reception type is unicast and using the second $P_{O\_PSFCH,Uu}$ value when the PSSCH reception type is groupcast.

13. The UE of claim 8, wherein:
the processor is further configured to determine a PSFCH transmission power $P_{PSFCH}$ as $P_{PSFCH}=P_{CMAX}$ responsive to a determination that a power value $P_{O\_PSFCH,Uu}$ is not provided by higher layers for a determination of a PSFCH transmission power, wherein $P_{CMAX}$ is a maximum transmission power; and
the transmitter is further configured to transmit the PSFCH with $P_{PSFCH}$ power.

14. The UE of claim 8, wherein:
the processor is further configured to determine a PSSCH reception type to be groupcast based on a destination identity field in the SCI format; and
the transmitter is configured to transmit the PSFCH with a larger power for a second HARQ-ACK reporting type than for a first HARQ-ACK reporting type.

15. A user equipment (UE) comprising:
a transmitter configured to transmit:
   a physical sidelink control channel (PSCCH) that includes a sidelink control information (SCI) format scheduling a reception of a physical sidelink shared channel (PSSCH), and
   the PSSCH that includes a transport block (TB);
a processor operably connected to the transmitter, the processor configured to determine whether or not to receive hybrid automatic repeat request acknowledgement (HARQ-ACK) information for the TB in a physical sidelink feedback channel (PSFCH) based on:
   information by higher layers indicating whether resources for a PSFCH transmission are available or unavailable, and
   an indication by a field in the SCI format responsive to a determination that the configuration indicates availability of the resources for the PSFCH transmission; and
a receiver operably connected to the processor, the receiver configured to receive or not receive the PSFCH with the HARQ-ACK information based on a result of the determination,
wherein the receiver does not receive the PSFCH with the HARQ-ACK information when the resources for the PSFCH transmission are indicated as unavailable even when the field indicates reporting of the HARQ-ACK information.

16. The UE of claim 15, wherein the processor is further configured to determine:
   a PSSCH reception type to be groupcast based on a destination identity field in the SCI format; and
   a HARQ-ACK reporting type, based on a field in the SCI format, to be either a first HARQ-ACK reporting type or a second HARQ-ACK reporting type and the HARQ-ACK information has a NACK value.

17. The UE of claim 15, wherein the processor is further configured to determine:
   a PSSCH reception type to be groupcast based on a destination identity field in the SCI format; and
   a location enabling transmission of the PSFCH based on a location indication field in the SCI format.

18. The UE of claim 15, wherein the transmitter is further configured to transmit the received HARQ-ACK information in a physical uplink control channel (PUCCH).

19. The UE of claim 15, wherein the transmitter is further configured to transmit the PSCCH and the PSSCH with a same energy per resource element.

20. The UE of claim 15, wherein:
the transmitter is further configured to transmit a channel state information reference signal (CSI-RS), and a transmission power for transmission of the CSI-RS is determined from a PSSCH transmission power, a number of PSSCH transmission layers, and a number of CSI-RS antenna ports.

\* \* \* \* \*